US007954094B2

(12) United States Patent
Cascaval et al.

(10) Patent No.: US 7,954,094 B2
(45) Date of Patent: May 31, 2011

(54) METHOD FOR IMPROVING PERFORMANCE OF EXECUTABLE CODE

(75) Inventors: Gheorghe Cascaval, Carmel, NY (US); Siddhartha Chatterjee, Yorktown Heights, NY (US); Evelyn Duesterwald, Ossining, NY (US); Allan Kielstra, Ajax (CA); Kevin Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1465 days.

(21) Appl. No.: 11/389,961

(22) Filed: Mar. 27, 2006

(65) Prior Publication Data

US 2007/0226698 A1    Sep. 27, 2007

(51) Int. Cl.
*G06F 9/45* (2006.01)
(52) U.S. Cl. ........ 717/145; 717/140; 717/153; 717/154; 717/159
(58) Field of Classification Search .................. None
See application file for complete search history.

(56) References Cited

U.S. PATENT DOCUMENTS

| 6,738,968 | B1 * | 5/2004 | Bosworth et al. | 717/157 |
| 7,421,681 | B2 * | 9/2008 | DeWitt et al. | 717/128 |
| 2002/0129343 | A1 * | 9/2002 | Pinter et al. | 717/140 |

OTHER PUBLICATIONS

V. Bale et al, A Transparent Dynamic Optimization System, Proc. of the ACM SIGPLAN 2000 Conf. on Prog. Language Design and Impl. pp. 1-2, Jun. 2000.

E. Duesterwald et al, Software Profiling for Hot Path Prediction: Less is More, ACM SIGPLAN Notices, 35(11), pp. 202-211, 2000.

D. Bruening, et al, An Infrastructure for Adaptive Dynamic Optimization, Proc. of the 1st Intl. Symp. on Code Generation and Optimization, pp. 265-275, Mar. 2003.

W.-K. Chen et al, A Dynamic Optimization System, Proc. of the 3rd ACMWorkshop on Feedback-Directed and Dynamic Optimization (FDDO-3), Dec. 2000.

J. C. Dehnert et al., The Transmeta Code Morphing Software; Using Speculation, Recovery, and Adaptive Retranslation to Address Real-Life Challenges, Proc. of the 1st Intl. Symp. on Code Generation and Optimization, pp. 15-24, Mar. 2003.

* cited by examiner

*Primary Examiner* — Chuck O Kendall
(74) *Attorney, Agent, or Firm* — Garg Law Firm, PLLC; Rakesh Garg; Libby Z. Toub

(57) ABSTRACT

A computer-implemented method, computer program product and data processing system to improve runtime performance of executable program code when executed on the data-processing system. During execution, data is collected and analyzed to identify runtime behavior of the program code. Heuristic models are applied to select region(s) of the program code where application of a performance improvement algorithm is expected to improve runtime performance. Each selected region is recompiled using selected performance improvement algorithm(s) for that region to generate corresponding recompiled region(s), and the program code is modified to replace invocations of each selected region with invocations of the corresponding recompiled region. Alternatively or additionally, the program code may be recompiled to be adapted to characteristics of the execution environment of the data processing system. The process may be carried out in a continuous recursive manner while the program code executes, or may be carried out a finite number of times.

79 Claims, 14 Drawing Sheets

Summary of main interfaces

1. Event notification in event producers:

notifyEvent(event_type eventId, attr_type attribute1, attr_type attribute2,...);

2. Explicit logging in event producers or consumers:

errorCode logEvent(event_type eventId, attr_type attribute1, attr_type attribute2, ....);

3. Implicit logging:

handle_type registerLogging(eventSet_type, events, context_type context, integer_type sampleRate);

4. Statistics:

handle_type registerStatistics(eventSet_type events, context_type context, integer_type sampleRate, statistic_operation_type op attr_pointer_type attrs);

5. Call Backs:

handle_type registerCallback(event_type event, context_type context, interger_type sampleRate, (void (*callback) (void *));

6. Operations on logging, statistics and callback handles:

enable, disable, read, reset, unregister

*FIGURE 14*

METHOD FOR IMPROVING PERFORMANCE OF EXECUTABLE CODE

This invention was made with Government support under the Department of the Interior, Contract No. NBCH30390004. THE GOVERNMENT HAS CERTAIN RIGHTS IN THIS INVENTION.

FIELD OF THE INVENTION

The present invention relates to methods, computer program products and data processing systems for executing code used for computer programming, and more particularly to methods, computer program products and data processing systems for improving the performance of executable program code.

BACKGROUND OF THE INVENTION

Computer software comprises a set of instructions to be executed by a data processing system. Generally, it is the computer software which makes a data processing system useful, by providing the instructions for the data processing system to carry out productive tasks. Computer software provides instructions that enable a data processing system to function as, for example, a word processing device, spreadsheet device, or an Internet browsing device.

There are a wide variety of different data processing systems capable of using computer software. Accordingly, as used herein, the term "data processing system" is intended to have a broad meaning, and may include personal computers, laptop computers, palmtop computers, handheld computers, network computers, servers, mainframes, workstations, cellular telephones and similar wireless devices, personal digital assistants and other electronic devices on which computer software may be installed. The terms "computer", "computer software", "computer program", "computer programming", "software", "software program" and related terms are intended to have a similarly broad meaning.

Generally, modern computer software is originally written in a "high level" computer programming language using syntactic constructs that are comprehensible by a programmer to represent the instructions embodied in the software. For example, in the "C" programming language, the syntactic term "printf" is used to represent an instruction to the data processing system to print the contents of a particular data field. High level computer programming languages are useful because their syntactic constructs make it easier for programmers to create computer software, since they do not need to compose instructions in a language that would be directly understood by the data processing system. Writing instructions in such a language would be far more difficult because such languages bear little or no resemblance to any human language.

Instructions written in a high level computer programming language, however, generally cannot be directly understood and implemented by a data processing system. Therefore, before a computer program written in a high level computer programming language may be used by a data processing system, it must first be "compiled" into language that will be understood by the target data processing system. Compiling is a process, usually carried out by a computer program called a "compiler", in which the syntactic constructs of the high level computer programming language are in essence translated into instructions in a language that will be understood by the target data processing system (possibly through an intermediate software layer). The result of the "compiling" or "compilation" process is known as "executable code", meaning computer program code that can be executed by the data processing system either directly or by an intermediate software layer.

High level computer programming languages may be viewed as falling within one of two broad types: statically compiled languages, and dynamically compiled languages.

In statically compiled languages, the compilation process is carried out a single time before any code is executed, and the result of the compilation is executable code that can be implemented directly by the data processing system without any intermediate software layer. Statically compiled languages include C, C++, FORTRAN, PL/I, COBOL and Ada.

In dynamically compiled languages, such as Java™, the source code is first compiled into an intermediate form that can be implemented by an intermediate software layer, such as a Java virtual machine (JVM). In Java, this intermediate form is known as "bytecode". (Java and all Java-based trademarks are trademarks of Sun Microsystems, Inc. in the United States, other countries, or both). Typically, but not necessarily, the intermediate software layer will carry out additional compilation each time the computer program is run, usually to translate the intermediate form of the source code into executable code that can be directly executed by the data processing system.

Usually, a direct translation of a computer program written in a high level computer programming language into executable code will not result in particularly efficient executable code. There may be for example, redundant operations, inefficient allocations of memory within the data processing system, and other circumstances which would impair the efficiency of the executable code. In addition, the order of instructions specified by the human programmer may not be the most efficient, or even nearly the most efficient, way to carry out the instructions on the data processing system. To obviate these difficulties, various performance improvement algorithms are applied when compiling computer programs written in a high level computer programming language. However, this approach entails a number of difficulties.

With statically compiled languages, the main problem is that at the time the computer program is compiled, the compiler program does not possess any of the information that can only be gathered at runtime (that is, when the computer program is executed), and which information can have a substantial impact on the efficiency of the computer program. An additional problem is that the compiler program may not be aware of the particular data processing system on which the resulting executable code will be executed, and will therefore be unable to adapt the executable code to the hardware features of the data processing system on which it will run. A number of different approaches may be applied to these problems.

The first approach is to simply ignore the problems, and statically compile the computer program for as specific or as general an architecture as the user specifies. In this case, statically compiled versions and dynamic or runtime checks are the only way to exploit some predefined runtime behavior or new or non-ubiquitous hardware features.

The second approach is to have a "training run" in which the user compiles the target program code once in a mode where the code, when executed, gathers useful information. This code is then executed using "training data" that is assumed to be typical of what will be supplied during application deployment. This is followed by a second compilation which exploits the knowledge gathered in the training run. There are a number of problems with this approach. First, it may be tedious and quite difficult to compose a set of training data that is meaningful and that covers all real execution scenarios. Second, and more importantly, experience has shown that very few software vendors are willing to embrace such mechanisms. Third, there are optimizations that are not amenable to collecting profiling information using an instrumented form of executable code, because the real behavior of the application is perturbed by the instrumentation. Fourth, there is a class of optimizations (e.g. invocation invariants) which are not correctly addressed with this mechanism and, in fact, one of the complexities of generating meaningful training data is having enough variation in the input to keep the system from falsely identifying opportunities for specialization that are only an artifact of the training data and not representative of the actual application in production.

A third approach is to compile some or all of the application "on demand." That is, a compiler would defer compilation of portions of or all of the application until the particular portion is executed, and then compile the portions based on available information about the runtime environment. However, this means that execution of the application will be interrupted by compilation, causing the application to run more slowly than is desirable, especially in the early stages of execution.

A fourth method involves (statically) compiling source code written in a statically compiled language so that the resulting executable code contains optimization directives. When the code is executed, the optimization directives may enable optimizations to be applied at runtime based on runtime data. See, for example, U.S. Pat. No. 6,427,234 to Chambers et al. Optimization directives should not be confused with ordinary runtime checks typically found in executable code compiled from source code written in a statically compiled language. Optimization directives generally respond to runtime data by generating, at runtime, new, specialized code that is more suited to the environment indicated by the runtime data. In contrast, ordinary runtime checks merely control execution flow by checking runtime conditions and directing program execution along a selected one of a plurality of pre-existing paths (code for each pre-existing path having been generated at compile time).

The first and second approaches are often inapplicable to dynamically compiled languages, since the program (or at least most of the program) may not exist until runtime. The third method, when applied to a dynamically compiled language, results in (temporarily) reduced performance because of time spent on compilation.

In addition, with dynamically compiled languages, the compilation process will proceed once through a series of optimization steps to generate the final executable application. Therefore, if the environment in which the application is executing changes, the executable application may suffer from reduced performance because the circumstances that formed the basis on which the application was optimized no longer exist.

SUMMARY OF THE INVENTION

In one aspect, the present invention is directed to a computer-implemented method for improving runtime performance of executable program code when the program code is executed on a data-processing system. During execution of the program code, the method collects runtime program data representing aspects of runtime behavior of the program code and analyzes the runtime program data to identify runtime behavior of the program code. In response to identifying the runtime behavior of the program code, and during execution of the program code, the method applies heuristic models to select at least one region of the program code for which application of a performance improvement algorithm is expected to improve runtime performance of the program code and, for each selected region, selects at least one performance improvement algorithm from a plurality of performance improvement algorithms based on analysis of the runtime behavior of the region. In response to selecting the at least one performance improvement algorithm for each such region, and during execution of the program code, the method recompiles each selected region according to the at least one selected performance improvement algorithm for that region to generate a corresponding recompiled region. The method also modifies the program code during execution thereof so that each subsequently executed invocation of each selected region becomes an invocation of the corresponding recompiled region so as to produce executable modified program code. The method iterates continuously during execution of the program code by recursively returning to the step of collecting runtime program data representing aspects of runtime behavior of the program code and analyzing the runtime program data to identify runtime behavior of the program code in response to completing the step of recompiling the selected regions and modifying the program code.

In one embodiment, the program code is a result of static compilation of source code written in one or more statically compiled computer programming languages. In particular embodiments, the one or more statically compiled computer programming languages is one or more of C, C++, FORTRAN, PL/I, COBOL or Ada. In another embodiment, the program code is a result of dynamic compilation of source code written in one or more dynamically compiled computer programming languages. In a particular embodiment, the one or more dynamically compiled computer programming languages comprises Java. In still another embodiment, the program code comprises a first portion that is a result of static compilation of first source code written in one or more statically compiled computer programming languages and a second portion that is a result of dynamic compilation of second source code written in one or more dynamically compiled computer programming languages. In particular embodiments, the statically compiled computer programming languages may comprise one or more of C, C++, FORTRAN, PL/I, COBOL or Ada, and the one or more dynamically compiled computer programming languages may comprise Java.

The method may further comprise, during execution of the program code, identifying characteristics of an execution environment of the data processing system. In such an embodiment, in response to identification of the characteristics of the execution environment of the data processing system, the method, during execution of the program code, applies heuristic models to select at least one region of the program code for which modification of the region to adapt the region to at least one of the identified characteristics of the execution environment is expected to improve runtime performance of the program code and, for each such selected region, selects at least one corresponding identified characteristic of the execution environment. In response to selecting the at least one corresponding characteristic of the execution environment, the method, during execution of the program code, recompiles each such selected region to adapt the region to the corresponding at least one characteristic of the execution environment to generate a corresponding recompiled region. The method also, during execution of the program code, modifies the program code so that each subsequently executed invocation of each such selected region becomes an invocation of the corresponding recompiled region so as to produce executable modified program code. The characteristics of the execution environment of the data processing system may comprise hardware features of the data processing system or software executing on the data processing system.

In another aspect, the present invention is directed to a computer-implemented method for improving runtime performance of executable program code when the program code is executed on a data-processing system. In this aspect, the method, during execution of the program code, identifies characteristics of an execution environment of the data processing system. In response to identifying the characteristics of the execution environment of the data processing system, the method, during execution of the program code, applies heuristic models to select at least one region of the program code for which modification of the region to adapt the region to at least one of the characteristics of the execution environment is expected to improve runtime performance of the program code and, for each selected region, selects at least one corresponding identified characteristic of the execution environment. In response to selecting, for each selected region, at least one corresponding characteristic of the execution environment, the method, during execution of the program code, recompiles each selected region to adapt the region to the corresponding at least one characteristic of the execution environment to generate a corresponding recompiled region and modifies the program code so that each subsequently executed invocation of each selected region becomes an invocation of the corresponding recompiled region so as to produce executable modified program code. The method iterates continuously during execution of the program code by recursively returning to the step of identifying characteristics of an execution environment of the data processing system in response to completing the step of recompiling the selected regions and modifying the program code. In one embodiment, the program code is a result of static compilation of source code written in one or more statically compiled computer programming languages. In particular embodiments, the one or more statically compiled computer programming languages may be one or more of C, C++, FORTRAN, PL/I, COBOL or Ada. In another embodiment, the program code is a result of dynamic compilation of source code written in one or more dynamically compiled computer programming languages. In a particular embodiment, the one or more dynamically compiled computer programming languages may comprise Java. In still another embodiment, the program code comprises a first portion that is a result of static compilation of first source code written in one or more statically compiled computer programming languages and a second portion that is a result of dynamic compilation of second source code written in one or more dynamically compiled computer programming languages. In particular embodiments, the one or more statically compiled computer programming languages may comprise one or more of C, C++, FORTRAN, PL/I, COBOL or Ada, and the one or more dynamically compiled computer programming languages comprises Java. The characteristics of the execution environment of the data processing system may comprise hardware features of the data processing system or software executing on the data processing system.

In still another embodiment, the present invention is directed to a computer-implemented method for improving runtime performance of executable program code when the program code is executed on a data processing system. The method, during execution of the program code, collects runtime program data representing aspects of runtime behavior of the program code and analyzes the runtime program data to identify runtime behavior of the program code. In response to identification of the runtime behavior of the program code, and during execution of the program code, the method applies heuristic models to select at least one region of the program code for which application of a performance improvement algorithm is expected to improve runtime performance of the program code and, for each selected region, selects at least one performance improvement algorithm from a plurality of performance improvement algorithms based on analysis of the runtime behavior of the region. In response to selecting at least one performance improvement algorithm for each such region, and during execution of the program code, the method recompiles each selected region according to the at least one selected performance improvement algorithm for that region to generate a corresponding recompiled region, and modifies the program code so that each subsequently executed invocation of each selected region becomes an invocation of the corresponding recompiled region so as to produce executable modified program code. The executable program code is compiled from source code written in one or more statically compiled computer programming languages and omits directives for runtime optimization. In one embodiment, the executable program code includes runtime checks. In particular embodiments, the one or more statically compiled computer programming languages may be one or more of C, C++, FORTRAN, PL/I, COBOL or Ada. The method may further comprise, during execution of the program code, identifying characteristics of an execution environment of the data processing system. In such an embodiment, in response to identification of the characteristics of the execution environment of the data processing system, the method, during execution of the program code, applies heuristic models to select at least one region of the program code for which modification of the region to adapt the region to at least one of the identified characteristics of the execution environment is expected to improve runtime performance of the program code and, for each such selected region, selects at least one corresponding identified characteristic of the execution environment. In response to selecting, for each such selected region for which modification of the region to adapt the region to at least one of the identified characteristics of the execution environment is expected to improve runtime performance of the program code, at least one corresponding characteristic of the execution environment, the method, during execution of the program code, recompiles each such selected region to adapt the region to the corresponding at least one characteristic of the execution environment to generate a corresponding recompiled region. The method also, during execution of the program code, modifies the program code so that each subsequently executed invocation of each such selected region becomes an invocation of the corresponding recompiled region so as to produce executable modified program code. The characteristics of the execution environment of the data processing system may comprise hardware features of the data processing system or software executing on the data processing system.

In a yet further aspect, the present invention is directed to a computer-implemented method for improving runtime performance of executable program code when the program code is executed on a data processing system. The method identifies, during execution of the program code, characteristics of an execution environment of the data processing system. In response to identification of the characteristics of the execution environment of the data processing system, the method, during execution of the program code, applies heuristic models to select at least one region of the program code for which modification of the region to adapt the region to at least one of the identified characteristics of the execution environment is expected to improve runtime performance of the program code and, for each such selected region, selects at least one corresponding identified characteristic of the execution environment. In response to selecting, for each such selected region, at least one corresponding characteristic of the execution environment, the method, during execution of the program code, recompiles each such selected region to adapt the region to the corresponding at least one characteristic of the execution environment to generate a corresponding recompiled region and modifies the program code so that each invocation of each such selected region becomes an invocation of the corresponding recompiled region so as to produce executable modified program code. The executable program code is compiled from source code written in one or more statically compiled computer programming languages and omits directives for runtime optimization. In one embodiment, the executable program code includes runtime checks. In particular embodiments, the one or more statically compiled computer programming languages may be one or more of C, C++, FORTRAN, PL/I, COBOL or Ada. The characteristics of the execution environment of the data processing system may comprise hardware features of the data processing system or software executing on the data processing system.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

FIG. 14 shows an overview of the main interfaces of an API according to an embodiment of a performance environment monitoring software utility.

DETAILED DESCRIPTION OF PREFERRED EMBODIMENTS

Figure 1:
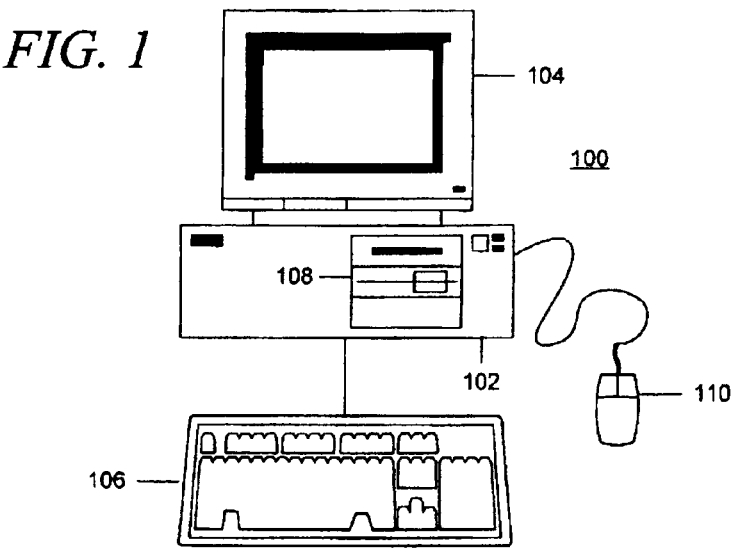
FIG. 1 is a pictorial representation of a data processing system in which the aspects of the present invention may be implemented.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer™ computer or IntelliStation® computer, which are products of International Business Machines Corporation, located in Armonk, N.Y. Although the depicted representation shows a personal computer, exemplary aspects of the present invention may be implemented in other types of data processing systems, such as laptop computers, palmtop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

Figure 2:
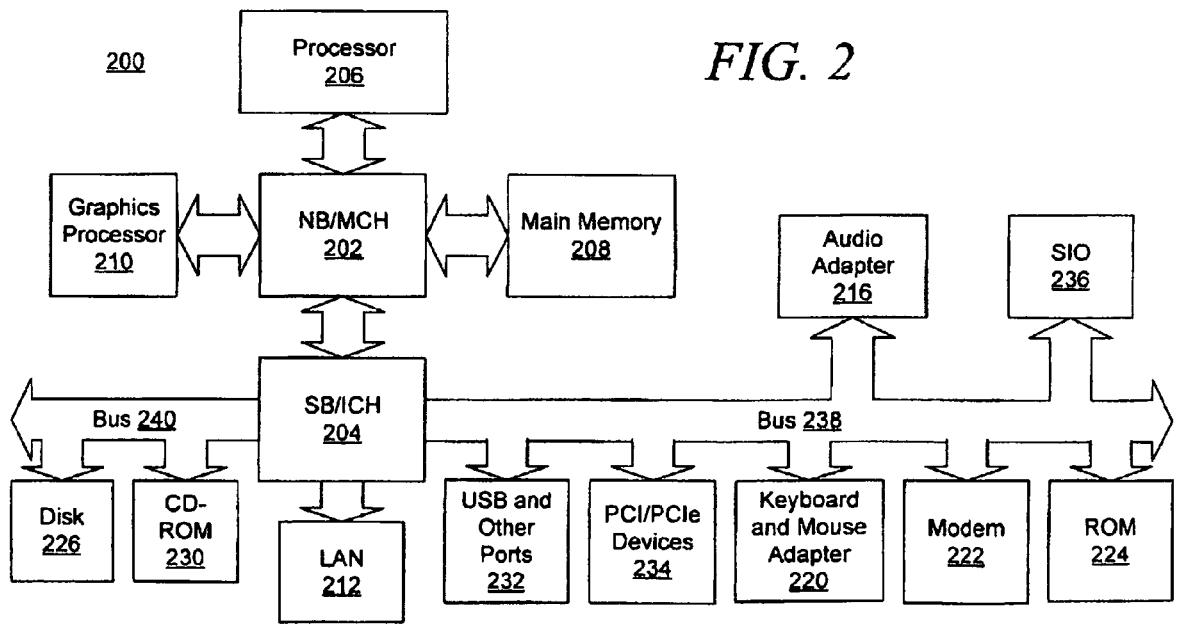
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 424, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200.

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. For example, data processing system 200 also may be a tablet computer, laptop computer, or telephone device in addition to taking the form of a PDA.

In accordance with an aspect of the present invention, there is provided a computer-implemented method for improving the runtime performance of a target computer program when executed on a data-processing system. As described above, the target computer program will comprise executable program code, so the method will seek to improve the runtime performance of the executable program code that makes up the target computer program. In one embodiment of an aspect of the present invention, the method is implemented by computer program code referred to herein as a Continuous Program Optimizer ("CPO"). An individual could install the CPO on the data processing system on which the target computer program will be executed.

It will be appreciated by one skilled in the art that the words "optimizer", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

In one embodiment, a data processing system on which an aspect of the present invention may be implemented comprises a static compiler (which may have but is not required to have an ability to optionally generate auxiliary code to gather profile information), a managed execution environment, consisting of a dynamic compiler and a dynamic linker, and a CPO. The CPO includes a set of CPO agents that model the performance of individual regions based on actual data and possible alternate compilation strategies. The CPO controls the CPO agents, and collects information about all or selected executing programs. The CPO may collect this information directly, or the information may be collected by a separate computer program that is directed by, and transmits the information to, the CPO. The CPO module is a persistent part of the operating environment.

Figure 3:
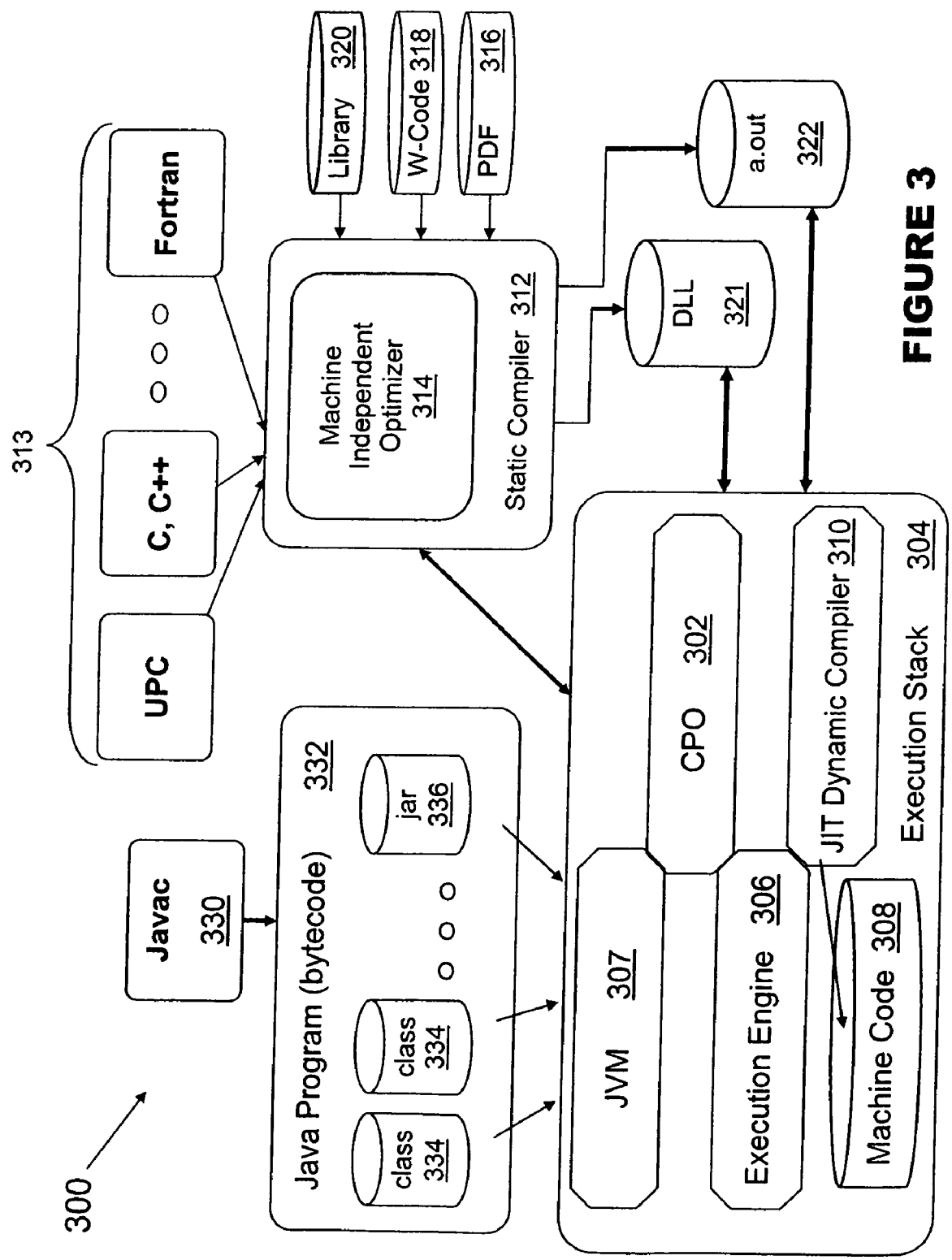
FIG. 3 is a conceptual diagram of a common managed runtime system incorporating a component according to an aspect of the present invention.

Reference is now made to FIG. 3, which is a conceptual diagram of a common managed runtime system 300 incorporating a CPO 302 according to an aspect of the present invention.

CPO 302 resides in execution stack 304 along with execution engine 306, virtual machine 307, which in this embodiment is a Java virtual machine (JVM), machine code 308 and just-in-time (JIT) dynamic compiler 310. CPO 302, execution engine 306, JVM 307 and JIT dynamic compiler 310 interact with one another and generate machine code 308 for execution by the data processing system on which the execution stack 304 resides. One or more static compilers 312 reside on the data processing system. Exemplary static compiler 312 comprises a machine-independent optimizer 314, and makes use of profile-directed feedback (PDF) files 316, W-Code files 318, and library files 320. As described above, static compiler 312 receives source code 313 written in a statically-compiled computer language as input and compiles the source code to output executable code, for example a dynamically linked library (DLL) 321 and/or a standalone executable file, denoted by a .out file 322, corresponding to the instructions in the source code. The machine-independent optimizer 314 will perform some optimization on the source code when compiling it into executable code.

Javac 330 is a static Java compiler which receives source code written in the Java language and compiles it into a Java program 332 comprising a plurality of class files 334 and .jar files 336. The Java program 330 is in bytecode and is adapted to be run by JVM 307, which receives bytecode as input and executes them. Optionally, the JVM may deliver the bytecode to the JIT dynamic compiler 310, which would then output executable code corresponding to instructions in the bytecode.

A program written in high-level source code is initially compiled with a static compiler (which may be static compiler 312, or may be Javac static compiler 330 if the program is written in Java). The user may (or may not) choose to compile the program with an option causing the static compiler to generate additional code to aid the CPO 302 in gathering profiling information. The result, whether from static compiler 312 or Javac compiler 330, is an executable computer program. When the program is executed, the CPO 302 monitors its execution.

Figure 4:
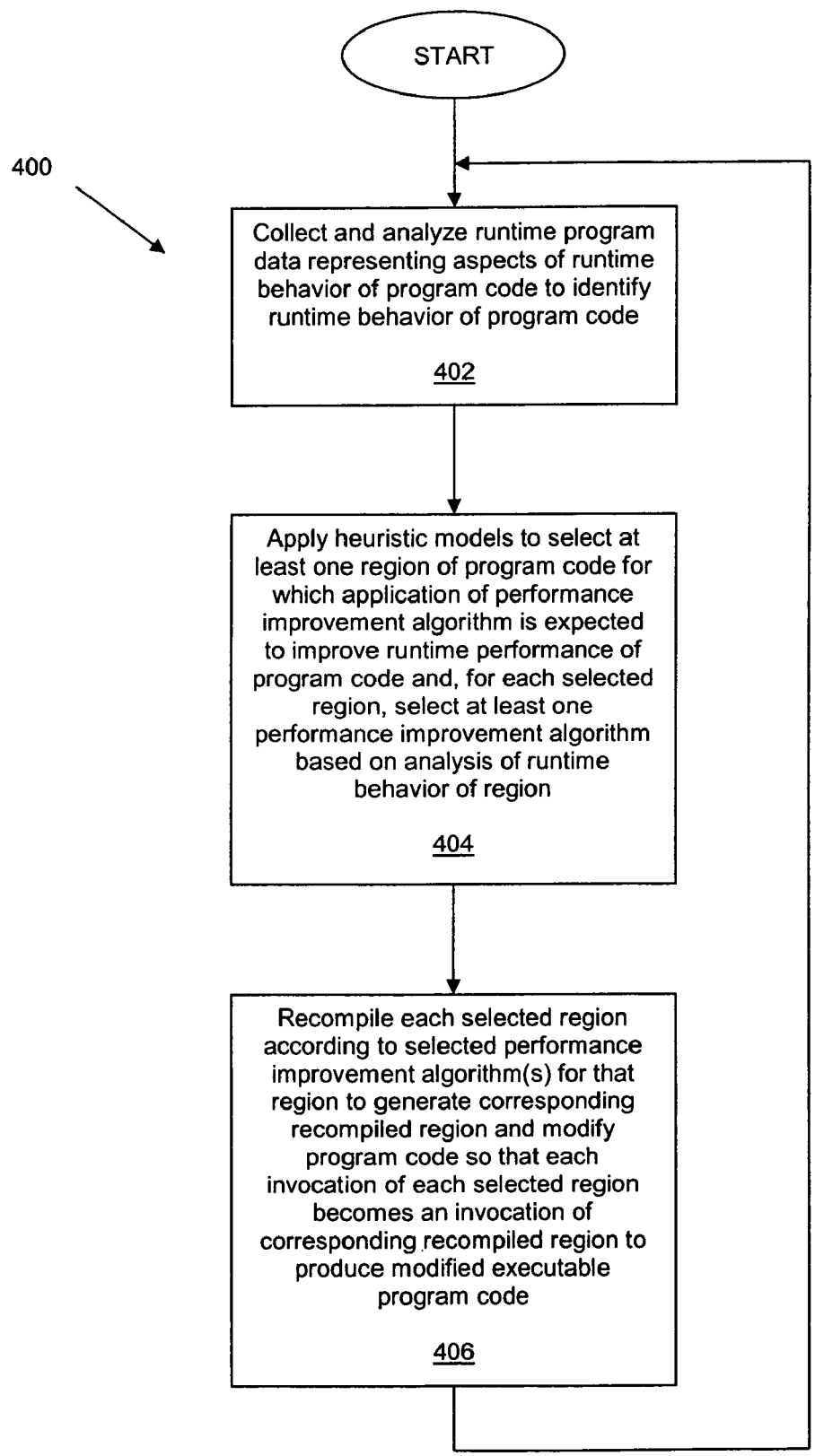
FIG. 4 is a flow chart showing a first embodiment of a first method according to an aspect of the present invention.

FIG. 4 is a flowchart showing the steps of a preferred embodiment of a method 400 according to an aspect of the present invention. It is to be appreciated that all of the steps of the method 400 are carried out during execution of the program code of the target computer program.

At step 402, the CPO collects runtime program data representing aspects of runtime behavior of the program code of the target computer program and analyzes the runtime program data to identify runtime behavior of the program code of the target computer program. The CPO monitors all (or selected) processes running across the entire data processing system, and may collect information from one or more of the following sources (this data may be collected through intermediate software, as will be described further below):

- hardware counters;
- operating system counters;
- information produced by computer program code that has been inserted into the target computer program by the compiler at the direction of the CPO;
- information produced by computer program code that has been inserted into the target computer program by the compiler in accordance with options specified by a user; and
- information gathered by supporting components such as application servers.

It should be noted that the sources of information are not limited to the list above, and that information from other sources may be collected by the CPO. The CPO monitors aspects of the execution of the target computer program as it is executed on the data processing system, and may also monitor all other computer programs, or certain specified other computer programs, that are executing on the data processing system.

The CPO preferably gathers information for each program region through the use of a plurality of CPO online agents, which may be part of the CPO or may be implemented by another computer program but directed by the CPO. (The term "region" will be discussed in greater detail below). Preferably, the CPO online agents form part of the CPO. Each CPO online agent reasons about a specific execution property of a region (e.g., the number of loads that result in d-cache misses) and determines which regions might benefit from recompilation in the light of known runtime information.

In particular, at step 404, responsive to identification of the runtime behavior of the program code of the target computer program, the CPO (preferably through the CPO online agents) applies heuristic models to select at least one region of the program code for which application of a performance improvement algorithm is expected to improve runtime performance of the program code. (A performance improvement algorithm may be "applied" to a region by recompiling the region according to the performance improvement algorithm). The CPO online agents are used to model idealized execution behavior given the monitored information. In this context, the term "idealized execution behavior" refers to a theoretical model of the best way in which the target computer program could execute, based on the information gathered about the manner in which the target computer program is actually executing.

Determination by the CPO that a region may benefit from application of a performance improvement algorithm (i.e. through recompilation) triggers a series of events. First a number of analyses are performed by the CPO. For example, if the identified ("hot") region is always "called from" a specific other region (e.g., a subroutine A always calls subroutine B, where subroutine B was identified as the "hot" one), it is usually desirable to recompile the calling region (the region containing subroutine A) since the "hot" subroutine B is expected to be inlined into the calling region to improve performance. The choice of the specific region to be recompiled depends upon a number of factors. These include how far up the call chain is reasonable given inlining behavior (of the dynamic compiler, which will be used to carry out the actual recompilation), the point at which the selected region is itself called from multiple points (according to the information gathered by the CPO), and whether or not the target program code will ever invoke a given region again. For example, if the only call to subroutine B is from subroutine A, it would normally be desirable to re-compile subroutine A. However, if subroutine A is in a loop and will never be called again, it would be futile to do so.

In addition, if the profiling information collected (for the region to be re-compiled) is broadly common across all execution instances of the program, the system may re-compile the region for all processes. However, if this is not the case, the CPO will determine which specific execution instance(s) would benefit from re-compilation and will generate specialized code for these processes. Specialized code is generally reached via indirect jumps.

For other optimization strategies, the analyses may vary, but in principle the same pattern of re-optimizing the code may be followed:

(a) detect a performance problem (or potential for performance improvement) by analyzing runtime behavior;
(b) identify the region that affects the behavior and its calling context; and
(c) recompile the code to apply performance improvement algorithms, taking the runtime information into account.

For example, the CPO may analyze runtime behavior of the executable program code to determine:

- data set sizes;
- an ordering of basic blocks to reduce branch mispredictions;
- appropriate places to insert pre-fetch instructions in order to minimize delinquent loads;
- likely targets of virtual calls;
- thread affinity and dynamic communication patterns;
- dynamic memory access patterns and cache pressure; and
- potential speculative optimizations that would require recompilation as a recovery plan (for example, preexistence based devirtualization or exploitation of very rarely changing variables);

In addition, the CPO may determine any number of other properties that can only be determined at execution time (and which may only apply to a specific execution instance).

The granularity of the code to which the above-described analysis is applied should be noted. In particular, the CPO agents apply the heuristic models to replaceable regions of code. Typically, a replaceable region is a subroutine or a function or a method. However, a replaceable region could be any section of code which can be entered and exited as a unit with all appropriate references (between the region and the rest of the program) correctly linkable.

CPO agents determine cases where if a region were recompiled with specific runtime information, that region might be executed faster. Specifically, using the runtime program data as input, the CPO agents can apply heuristic models to identify one or more instances in which applying a performance improvement algorithm to a region of the target program code would be expected to improve runtime performance of the program code. Thus, in addition to selecting regions of the program code for which performance improvement appears possible, the CPO agents will also, for each such selected region, select at least one performance improvement algorithm based on the analysis of the runtime behavior of the region. The performance improvement algorithm is selected from a plurality of performance improvement algorithms; it would be these performance improvement algorithms that would have served as the basis for the heuristic modeling carried out by the CPO agents.

For example, a CPO agent could observe that a specific method (i.e. a "region") is responsible for a relatively large proportion of the execution time of the target computer program, and may further observe that there are a significant number of branch prediction misses in that region. Having identified the region and the opportunity for performance improvement, the CPO agent would then select a suitable performance improvement algorithm that could be applied to that region to obviate the cause of the sub-optimal performance. An example of a suitable performance improvement algorithm is one that would provide for reordering of instructions within the region to reduce the number of branch prediction misses. Such algorithms are well known in the computer programming arts.

It will be appreciated that a large number of performance improvement algorithms, adapted to a wide variety of suboptimal performance situations, are known in the computer programming arts, and that any suitable algorithms may be used within a method according to the present invention. Numerous performance improvement algorithms may be found, for example, in "Advanced Compiler Design and Implementation" by Steven S. Muchnick, published by Morgan Kaufman Publishers Inc., Copyright 1997, ISBN No. 1-55860-3204. Moreover, new performance improvement algorithms continue to be developed by astute programmers, and it is expressly contemplated that the present invention may in future be adapted to utilize subsequently developed performance improvement algorithms.

At step 406, in response to selecting appropriate performance improvement algorithms for the selected regions, the CPO will recompile the selected region(s) according to their respective performance improvement algorithm(s) to generate corresponding recompiled region(s) which have been altered to make use of the respective performance improvement algorithm(s). (In some cases, it may be necessary for the CPO to recompile a larger region containing a selected region). Because this recompilation takes place while the target computer program is being executed by the data processing system, it is dynamic recompilation for which a dynamic compiler is used. The dynamic compiler may form part of the CPO, or may be a separate computer program that may be directed by the CPO. Preferably, the dynamic compiler is a separate component that is directed by the CPO.

For each selected region, the CPO enumerates the code sites which have been known to "call" the region. For any given region, there will exist a set of callers, although the CPO may not be immediately aware of the entirety of that set, or where known set members physically reside. There may, however, be a subset of callers about which the CPO does possess information. Examples include those sites which make calls with arguments that are provably constant at runtime (for example, those that pass in address constants) or are constant according to the collected profile information. Callers about which the CPO possesses adequate information are noted and included in a "list of special callers". (In some instances, this list may be an empty set because there are no callers that meet the required criteria). It should be noted that in the embodiment herein described, a call site which calls the region via a virtual call will only be considered for the list of special callers if the virtual function pointer (used to make the call) is also a runtime constant. (As will be discussed below, the CPO operates iteratively and recursively, so the caller itself can be recompiled with instrumentation to determine this data, if desired). Calls in the list of special callers may benefit from special optimization. (It should be noted that all callers to the selected region will ultimately be modified to invoke a newly optimized version of the region; this process will be discussed further below).

Responsive to creating the list of special callers, the dynamic compiler begins to (re)compile the identified region. Specifically, it builds an internal representation of the region. In a particular embodiment, the dynamic compiler extracts the intermediate representation from where it is stored in the corresponding object file. (This representation may or may not have been optimized by a static optimizer). Optionally, the dynamic compiler could actually re-compile the source code or could disassemble (i.e. reverse compile) the machine code of the existing version of the region. Responsive to obtaining (or creating) the intermediate representation of the selected region, the dynamic compiler performs certain optimizations, including inlining. The dynamic compiler determines which optimizations (i.e. performance improvement algorithms) are applied, and the sequence in which they are applied, based on the information provided by the CPO agents and also by analysis of the intermediate representation of the method to be recompiled.

The dynamic compiler also consults the list of special callers and the intermediate representation of the selected region, and determines whether specialized versions of the region using the appropriate constants in place of the corresponding parameter would result in significantly superior code. Based on this analysis, the dynamic compiler will generate a set of desirable target procedures: one general version of the target region, and zero or more specialized versions of the target region based on unchecked constants (for arguments which are provably constant at run time) and checked constants (guarded, profiled constant). Those call sites in the list of special callers for which the knowledge of constant arguments would not benefit the final code are deleted from the list. These deleted callers will be handled in the same manner as callers that were not originally included in the list of specialized callers.

The dynamic compiler then further optimizes each version of the target region and compiles each version into native (executable) code. The dynamic compiler uses whatever profile information is available during this process. It is important to note (as will be discussed further below) that this dynamic re-compilation process is recursively iterative. Thus, one compilation may include code to perform lightweight online profiling which will be used to direct subsequent compilations. Lightweight profiling can convey to the CPO information such as invocation invariants like data set sizes as well as basic block ordering information to reduce branch mispredicts, identification of delinquent loads to guide pre-fetch operations and virtual call distributions to guide speculative optimizations. In addition, the CPO can make use of what it has learned via online profiling about which regions are hot and can leave instrumentation in the cold areas. This instrumentation can be used to detect phase changes.

In addition, the dynamic compiler can simplify linkages from within the dynamically compiled region to other components since addresses that are not normally known at link time are known at dynamic compilation time. (The CPO can identify addresses of program elements external to the dynamically re-compiled region).

In addition to recompiling the selected regions, at step 406 the CPO also modifies the program code so that each subsequently executed invocation of each selected region becomes an invocation of the corresponding recompiled region. Thus, links to the selected regions are adjusted to refer to the newly recompiled regions. The result is executable modified program code for the target computer program (which is still being executed by the data processing system).

In particular, each (remaining) member of the list of special callers corresponds to a call to one of the specialized versions of the target region, and each of these call sites is adjusted accordingly. The dynamic compiler either alters the direct branch to branch to the newly generated specialized version of the region, or updates the function pointer used for the indirect branch in an analogous manner.

In addition to updating the members of the list of special callers, all remaining calls to the original region must be updated. The dynamic compiler does this by changing the first instruction of the original version of the region to jump to a fix-up method. The fix-up method performs the following (upon being called, which happens when some call site invokes the original "callable region"):

(a) the fix-up method finds and categorizes the call site;
(b) if the call site is a direct call, the fix-up method updates the direct branch to branch to the new, general version;
(c) if the call site is a virtual call, the fix-up method attempts to locate the corresponding function pointer (by disassembling the call itself).
(d) if the fix-up method can identify the function pointer, the fix-up method updates the function pointer to point to the new, general version;
(e) if the fix-up method cannot identify the function pointer, the fix-up method executes the original first instruction of the original version of the "callable region" and then jumps directly to the second instruction.

Accordingly, the dynamic compiler will have adjusted the links to the selected regions so that they refer directly to the newly recompiled regions in all but the rare case in which a function pointer cannot be clearly identified. In this rare case, the fix-up method effectively serves as a "bridge" between the "old" region and the recompiled region. Accordingly, even in the rare case where a function pointer cannot be clearly identified, the relevant code is modified so that the invocation of the "old" region becomes an (indirect) invocation of the corresponding recompiled region.

Accordingly, the call replacement and persistent fix-up method, combined with recompilation of the selected regions of the program code, results in executable modified program code.

It should be noted that where a region is recompiled, there will be two versions of the region: an "old" (un-recompiled) version and a "new" (recompiled) version. The "old" region will continue to exist (possibly forever); however, direct calls and function pointers that are known to target the "old" region are updated to target the "new" region, and the entry point to the "old" region is modified so that it will determine which caller is calling the "old" code, modify the caller to call the "new" code in the future, and branch to the "new" code. It is preferable to permit the "old" region to continue to exist, since there may be some code continuing to loop within the "old" region for an extended period of time.

The executable modified program code for the target computer program is, itself, subject to CPO monitoring. In a particular embodiment, the method 400 iterates continuously by recursively returning to step 402 in response to completion of step 406, so that step 402 will be applied to the modified program code. For example, as noted above, during a particular dynamic re-compilation, the CPO could (automatically) insert code specifically to enable other CPO agents to collect information for further recompilation. (Known light-weight profile gathering techniques may be used for this purpose). Accordingly, monitoring and re-optimization is a continuous process. Even after a region of the program code has been recompiled to take advantage of a particular configuration of the data processing system on which it is executing, or a specific workload configuration, the CPO continues to monitor the performance of the executable program code of the target computer program. Based on changes in circumstances relating to the data processing system and the programs executing thereon, the CPO may decide to recompile different regions, to recompile regions that were previously recompiled to apply a different set of optimizations, or even to recompile regions so as to reverse (i.e. "undo") optimizations that were deemed profitable at some moment in time, but for which appropriate conditions no longer exist. It will be appreciated that "undoing" a previously applied optimization is merely a particular case of applying a performance improvement algorithm, that is, the application of a heuristic model would indicate that one or more performance improvement algorithms corresponding to the original state of the region (i.e. before the previous optimization) should be applied.

While the method 400 iterates continuously in a recursive manner, it will be appreciated that such recursive iteration will terminate when the target program code stops executing. In addition, the CPO may be provided with a break function by which the continuous recursive iteration of the method 400 may be interrupted even during execution of the program code, for example at the direction of a user or in the case of a software malfunction.

The method 400 described above may be implemented by the CPO to improve runtime performance of executable program code by collecting and analyzing runtime program data to identify runtime behavior of program code. Based on the runtime behavior, the CPO would identify regions of the program code that were potentially amenable to the application of performance improvement algorithms, and then recompile those regions to reflect those algorithms. An analogous method can be applied by the CPO, except that instead of identifying runtime behavior of the target program code, the CPO identifies characteristics of the execution environment of the data processing system on which the target program code is executing. This will allow the CPO to find opportunities to exploit hardware features that either did not exist when the target computer program was originally created, or which could not be relied on to be present when the target computer program was created. This method will now be described with reference to FIG. 5.

Figure 5:
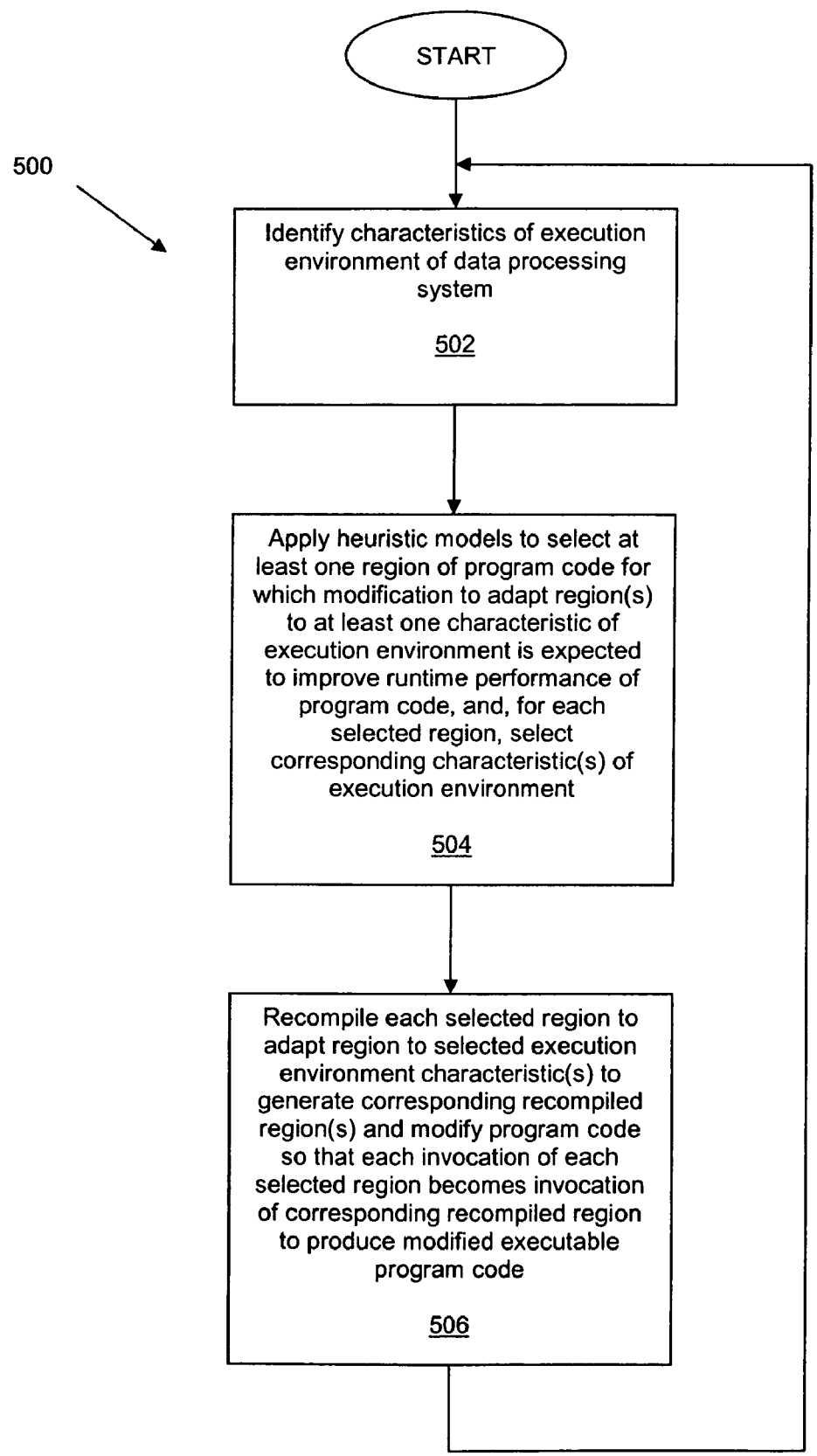
FIG. 5 is a flow chart showing a second embodiment of a first method according to an aspect of the present invention.

FIG. 5 shows a flowchart of a method 500 for improving the runtime performance of executable target program code when the program code is executed on a data processing system. As with the method 400, the method 500 is carried out during execution of the target program code, and is preferably carried out by the CPO through the use of CPO online agents.

At step 502, the CPO identifies characteristics of an execution environment of the data processing system. Such characteristics may include hardware features of the data processing system and/or software executing on the data processing system. Hardware features include hardware performance counters (e.g. L1 cache misses) and software features include operating system performance counters (e.g. virtual page faults) and higher level counters (e.g. HTTP requests per unit time). In a particular embodiment, a user may define his or her own counters and provide for the CPO to monitor these counters.

At step 504, in response to identification of the characteristics of the execution environment of the data processing system, the CPO applies heuristic models to select at least one region of the target program code for which modification of the region to adapt the region to at least one of the characteristics of the execution environment is expected to improve runtime performance of the program code. A particular region of code may be able to take advantage of a certain feature of the execution environment and thereby achieve efficiency improvements. Analogously, there may be a particular feature of the execution environment for which the code structure of the region is not well suited, resulting in (unnecessary) efficiency reductions. In each case, adapting the region of the target program code to the particular characteristic of the execution environment would be expected to result in improved runtime performance of the region, and therefore of the target program code. At step 504, in addition to selecting a region for which improved performance appears possible, the CPO also selects, for each selected region, at least one corresponding identified characteristic of the execution environment to which the region will be adapted. It will be appreciated that the identification and selection procedures of step 504 may be carried out analogously to the identification and selection procedures of step 404.

At step 506, responsive to selecting, for each selected region, at least one corresponding characteristic of the execution environment, the CPO recompiles each selected region to adapt the region to the corresponding characteristic(s) of the execution environment. The result of this recompilation is, for each region, a corresponding recompiled region which has been adapted to the selected characteristic(s) of the execution environment. In addition to recompiling the selected regions, at step 506 the CPO also modifies the target program code so that each subsequently executed invocation of each selected region becomes an invocation of the corresponding recompiled region. Thus, links to the recompiled regions are adjusted to become (direct or indirect) links to the newly recompiled regions. The result, including the recompiled regions and the adjusted regions, comprise executable modified program code for the target program (which is still being executed by the data processing system). One skilled in the art will appreciate that the recompilation procedure of step 506 may be carried out analogously to the recompilation procedure of step 406.

Analogously to the method 400, the method 500 iterates continuously by recursively returning to step 502 in response to completion of step 506, and applying step 502 to the modified program code. As with the method 400, this permits the CPO to continuously assess changes in circumstances relating to the data processing system and the computer programs executing thereon, and to adapt the target program code accordingly. Similarly to the method 400, a break function may be provided by which the continuous recursive iteration of the method 500 may be interrupted.

Although the method 400 and the method 500 may each be carried out individually, and may be carried out substantially simultaneously and in parallel (although not necessarily in synchronization), it is advantageous to combine the techniques of each method into a single method. An example of such a single method is now described with reference to FIG. 6.

Figure 6:
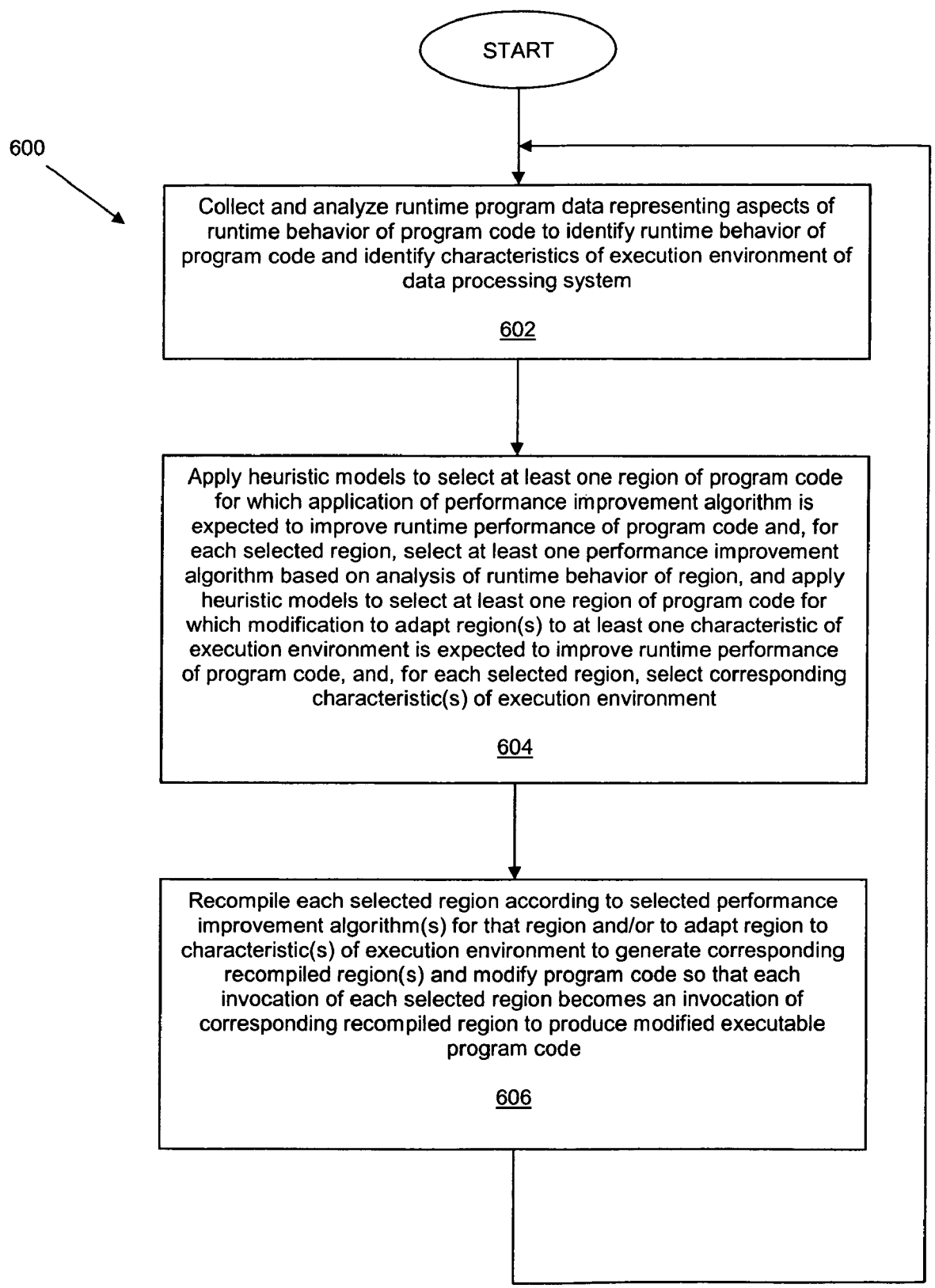
FIG. 6 is a flow chart showing a third embodiment of a first method according to an aspect of the present invention.

FIG. 6 is a flowchart of an exemplary embodiment of a method 600 combining aspects of exemplary method 400 and exemplary method 500 into a single method 600.

At step 602, the CPO collects and analyzes runtime program data representing aspects of runtime behavior of the target program code to identify runtime behavior of the target program code, and also identifies characteristics of the execution environment of the data processing system on which the target program code is executing. As was the case with the methods 400 and 500, these processes are preferably carried out by CPO online agents.

At step 604, the CPO applies heuristic models to select at least one region of the target program code for which application of a performance improvement algorithm is expected to improve runtime performance of the target program code. For each selected region, the CPO selects at least one performance improvement algorithm based on analysis of the runtime behavior of region. Also at step 604, the CPO applies heuristic models to select at least one region of program code for which, if the region were modified so that the region were adapted to at least one characteristic of the execution environment of the data processing system on which the target program code is executing, an improvement in runtime performance of the target program code would be expected. For each region so selected, the CPO will also select at least one corresponding characteristic of the execution environment, to which the region will be adapted.

It should be noted that a particular region may be selected for both application of a performance improvement algorithm as well as adaptation to a characteristic of the execution environment. Moreover, it should be noted that a particular region may have more than one performance improvement algorithm applied, and/or may be adapted to more than one characteristic of the execution environment.

At step 606, the CPO recompiles each selected region, according to selected performance improvement algorithm(s) for that region and/or to adapt the region to characteristic(s) of the execution environment, so as to generate corresponding recompiled regions. In addition, at step 606 the CPO will modify the target program code so that each subsequently executed invocation of each selected region becomes a (direct or indirect) invocation of the corresponding recompiled region, so as to produce executable modified program code. This is done in a manner analogous to that described in respect of step 406 of the method 400. The method 600 iterates continuously by recursively returning to step 602 in response to completion of step 506, and applying step 602 to the modified program code, and, as with the methods 400 and 500, a break function may be provided by which the continuous recursive iteration of the method 600 may be interrupted.

In the exemplary embodiments described in the context of FIGS. 4, 5 and 6, the target program code was generated by a static compiler. In other words, the target program code was a result of static compilation of source code written in one or more statically compiled computer programming languages, including (but not limited to) C, C++, FORTRAN, PL/I, COBOL and Ada. However, the methods of the present invention, such as methods 400, 500 and 600 described above, are not limited to executable program code resulting from static compilation of source code written in a statically compiled computer programming language. The methods of the present invention can also be applied to executable program code that is the result of dynamic compilation of source code written in one or more dynamically compiled computer programming languages, such as Java.

Moreover, the methods of the present invention may be applied to executable program code that does not result solely from static compilation of a statically compiled computer programming language or solely from dynamic compilation of a dynamically compiled computer programming language. The methods of the present invention, for example methods 400, 500 and 600, may also be applied to target program code that comprises a first portion resulting from static compilation of a first source code component written in one or more statically compiled computer programming languages, and a second portion resulting from dynamic compilation of a second source code component written in one or more dynamically compiled computer programming languages. For example, a program written primarily in Java (a dynamically compiled language) may use the Java native interface (JNI) to call a function or method written in a statically compiled language (such as C).

As has been described above, methods according to one aspect the present invention preferably iterate continuously while the target program code is executing. However, methods according to another aspect of the present invention may be advantageously applied, without continuous iteration, to executable program code that is compiled from source code written in one or more statically compiled computer programming language. (For example, target program code may comprise a first portion written in a first statically compiled language, and a second portion written in a second statically compiled language). Such source code would contain, prior to initiation of execution thereof, all components required for execution.

Figure 7A:
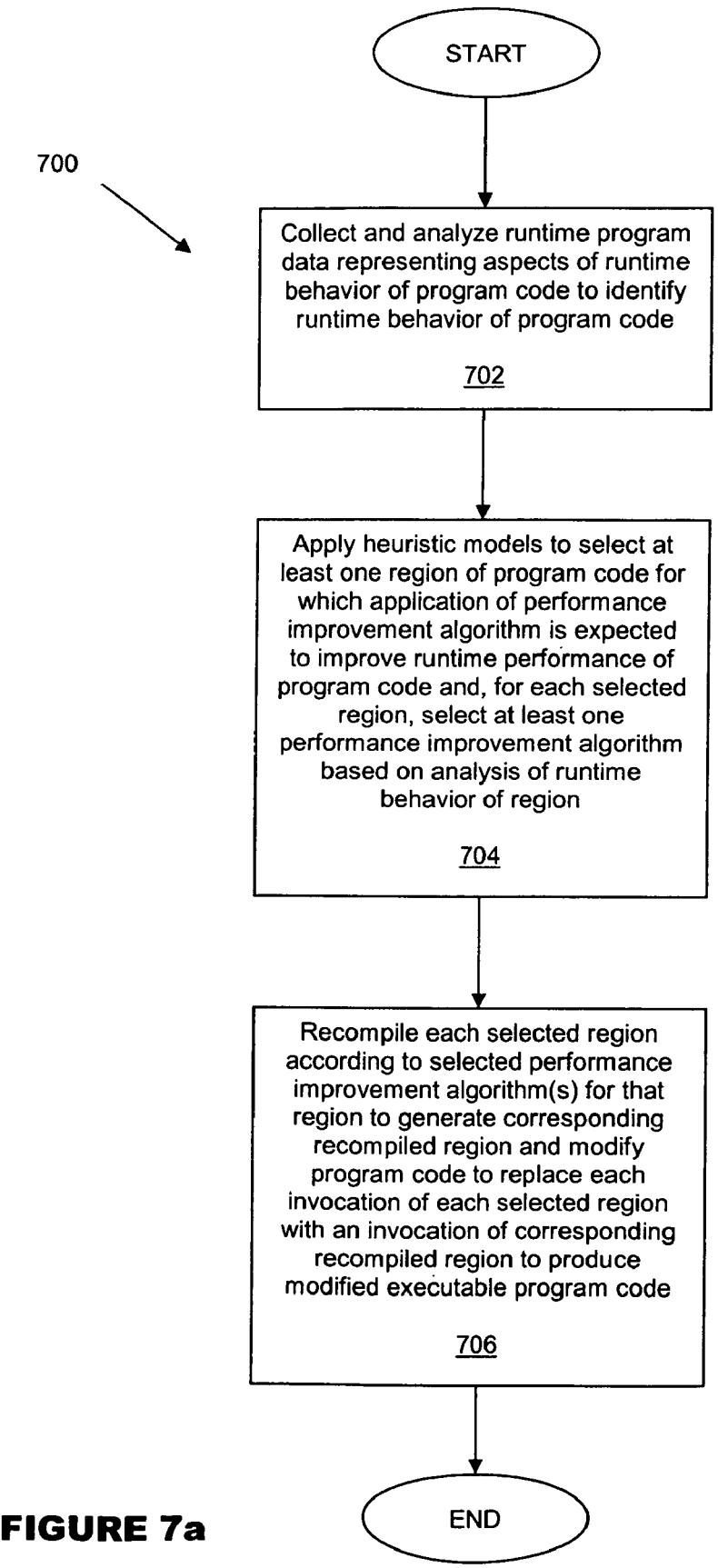
FIG. 7a is a flow chart showing a first embodiment of a second method according to an aspect of the present invention.

With reference now to FIG. 7a, there is shown an exemplary embodiment of a method 700 for improving runtime performance of executable program code compiled from source code written in one or more statically compiled computer programming languages. The method 700 may be used to improve the runtime performance of any executable program code compiled from source code written in one or more statically compiled computer programming languages, whether or not the executable program code was compiled to include its own optimization directives.

At step 702, the CPO collects runtime program data representing aspects of runtime behavior of the program code and analyzes the runtime program data to identify runtime behavior of the program code. This step is analogous to step 402 in method 400.

At step 704, responsive to identification of the runtime behavior of the program code, the CPO applies heuristic models to select at least one region of the program code for which application of a performance improvement algorithm is expected to improve runtime performance of the program code. For each selected region, the CPO selects at least one performance improvement algorithm from a plurality of performance improvement algorithms based on analysis of the runtime behavior of the region. Step 704 is analogous to step 404 of method 400.

At step 706, responsive to selecting, for each selected region, at least one performance improvement algorithm from a plurality of performance improvement algorithms based on analysis of the runtime behavior of the selected region, the CPO recompiles each selected region according to the selected performance improvement algorithm(s) for that region, and generates a corresponding recompiled region. Also at step 706, the CPO modifies the program code so that each subsequently executed invocation of each selected region becomes a (direct or indirect) invocation of the corresponding recompiled region. The result of step 706 is modified executable program code. Step 706 is analogous to step 406 of method 400; however, after completion of step 706, the method 700 ends.

Figure 7B:
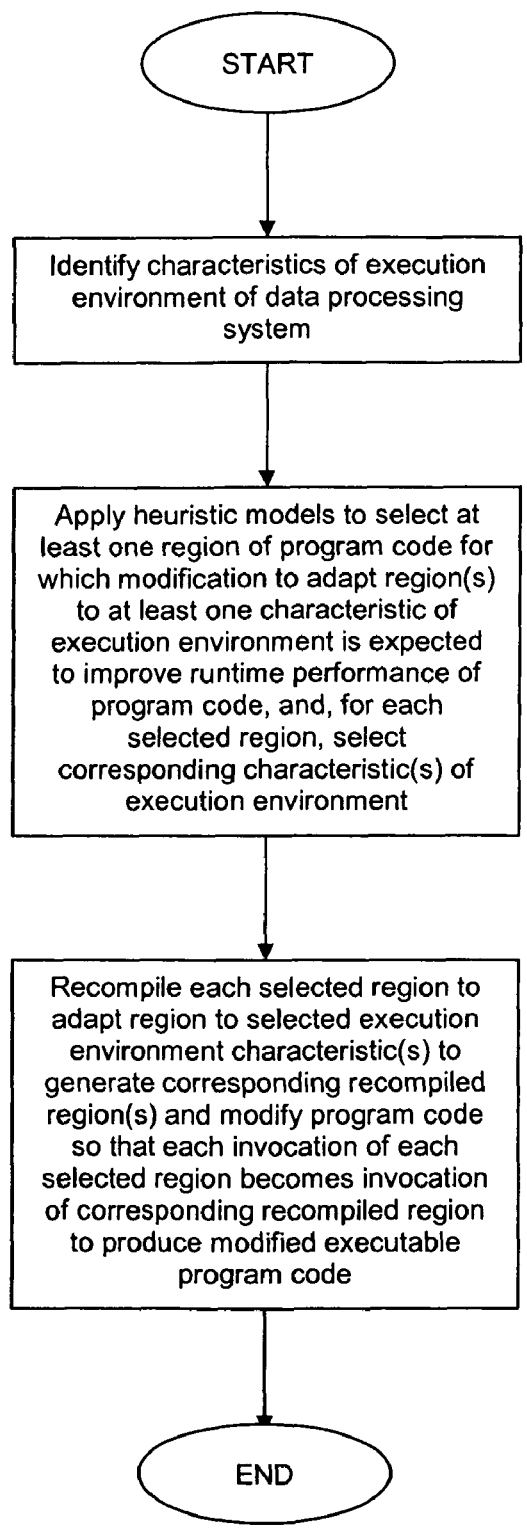
FIG. 7b is a flow chart showing a second embodiment of a second method according to an aspect of the present invention.
Figure 7C:
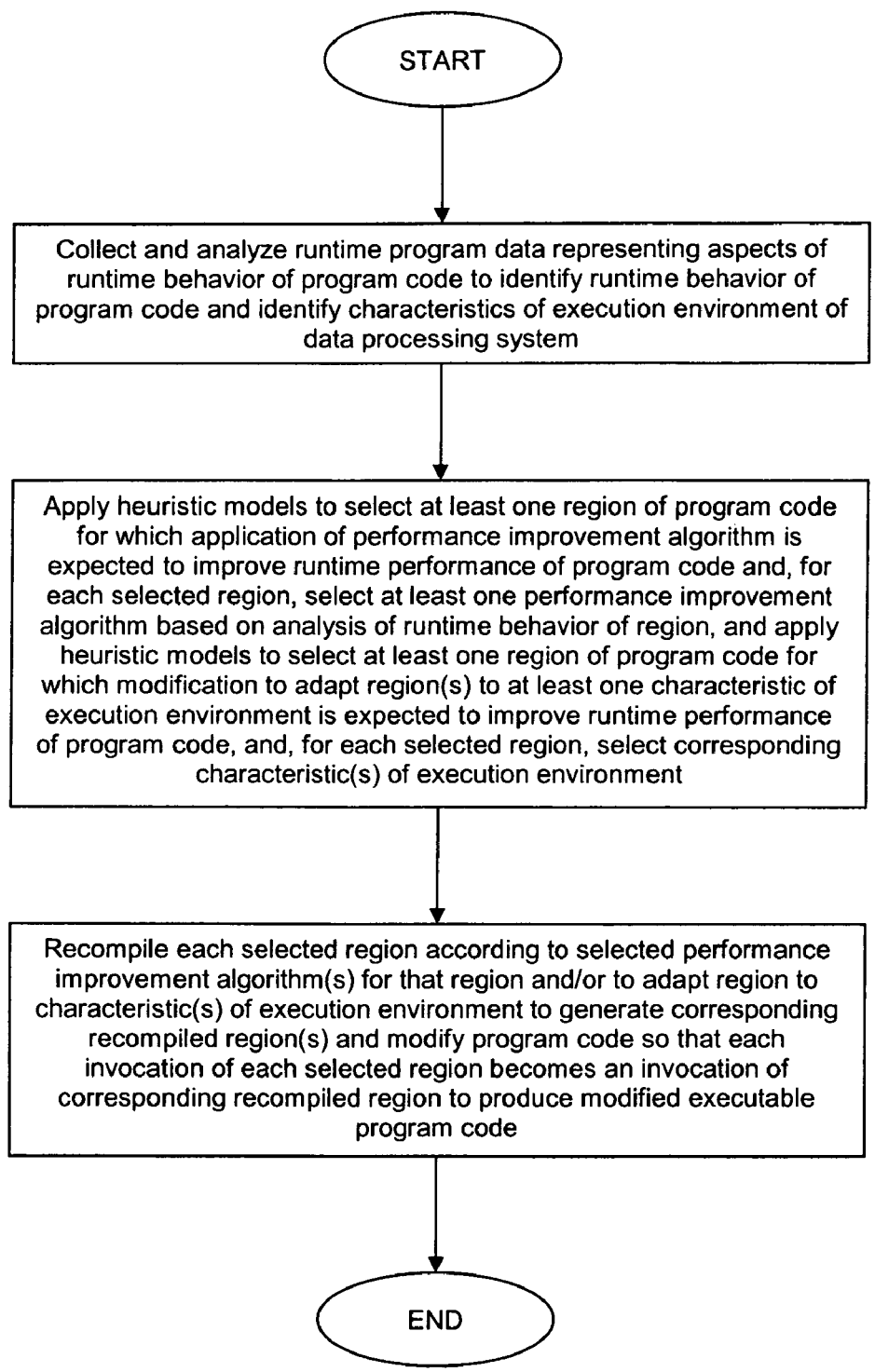
FIG. 7c is a flow chart showing a third embodiment of a second method according to an aspect of the present invention.

It will be appreciated that method 700 may be adapted to identify characteristics of the execution environment of the data processing system on which the target program is executing, and to modify regions of the target program to adapt those regions to selected characteristics of the execution environment. The method 700 may be adapted to consider characteristics of the execution environment instead of runtime behavior of the program code, analogously to method 500 and as illustrated in FIG. 7b, or may consider both runtime behavior of the program code as well as characteristics of the execution environment, analogously to method 600 and as shown in FIG. 7c. In contrast to methods 500 and 600, however, the methods shown in FIGS. 7a, 7b and 7c do not iterate recursively.

A method such as the methods shown in FIGS. 7a, 7b and 7c may be desirable in circumstances in which it is not considered necessary or profitable to continuously recursively analyze and re-optimize a target program code as it executes, but where performance improvement may still be gained by carrying out a single analysis and (re)optimization as the target program code executes, or by carrying out a finite number of such analyses and (re)optimizations. For example, a particular computer program may have been written in a statically compiled language and compiled into executable form before certain optimization strategies were known, or before certain beneficial hardware features were available. Moreover, the method 700 may be particularly advantageous when applied to executable code that does not include any optimization directives (and which is therefore unable to adjust itself to improve performance based on its runtime environment).

Dynamic recompilation of a target program according to an aspect of the present invention, even if carried out only once or for a finite number of iterations, can allow a target computer program to be adapted to take advantage of such strategies and/or features while it is executing. Such a method may be applied to any executable application, including an application that was written in a statically compiled language and compiled so that the application, when executing, is ignorant of opportunities for performance improvement.

Figure 8:
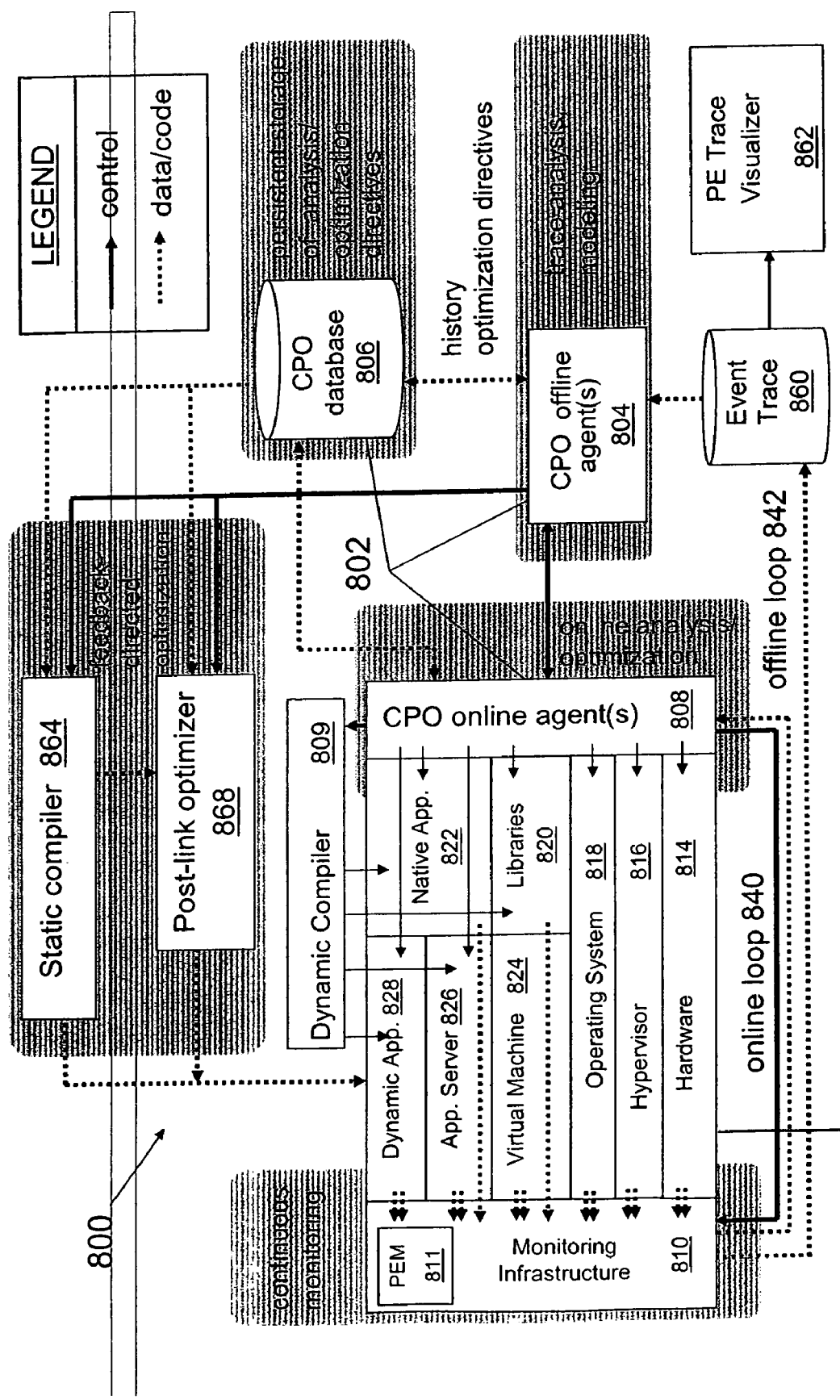
FIG. 8 is an exemplary embodiment of an architecture for an exemplary computer program according to and aspect of the present invention, operating within a data processing system.

An exemplary embodiment of an architecture 800 for a CPO operating within a data processing system is illustrated in FIG. 8. As indicated by the legend for FIG. 8, control is denoted by solid arrows, and data/code flows are denoted by dashed arrows.

In the exemplary embodiment shown, the CPO 802 comprises one or more CPO offline agents 804, a CPO database 806, and one or more CPO online agents 808. In this exemplary embodiment, it is the CPO online agents 808 which carry out the analysis steps 404, 504, 604, 704 to determine which regions of the target program code would benefit from recompiling. The CPO offline agents 804 perform trace analysis and modeling operations that are too expensive to carry out during execution of the target computer program. The CPO database 806 provides persistent storage of analysis and optimization directives that may be acted upon by the CPO online agents 808 and the CPO offline agents 804.

An execution stack 812 comprises a hardware layer 814 and a plurality of software layers 816, 818, 820, 822, 824, 826, 828 running on top of the hardware layer 814. The terms "running on top of" and "runs on top of" mean, in this context, that a software layer will make use of services provided by one or more of the software layers (or the hardware layer 814) below it. In the exemplary execution stack 812 shown in FIG. 8, a hypervisor layer 816 runs on top of the hardware layer 814, and one or more operating systems 818 run on top of the hypervisor 816. A hypervisor is a software program that permits multiple operating systems to reside, without modification, on the same data processing system, and an operating system is a computer program that coordinates the operation of, and resource use by, other computer programs. Windows XP is an example of a commercially available operating system. A virtual machine 824 (for example, a Java virtual machine) and a plurality of libraries 820 run on top of the operating system 818, and one or more native applications 822 run on top of the libraries. An application is a computer program which provides a user with productive functionality for specific tasks, and the term "native" indicates that the application is designed to operate on a specific data processing platform. Examples of applications include, but are not limited to word processing programs, e-mail programs, database programs, spreadsheet programs, and Internet browsing programs. A virtual machine is a computer program which receives the intermediate executable form of a dynamically compiled language, and converts it into program code that can be executed by the relevant data processing system. For example, a Java virtual machine receives Java bytecode as input. Libraries are collections of subprograms useful in software development, and may, for example, include frequently used subroutines so that programmers do not have to create such subroutines from scratch each time they write a computer program. An application server 826 runs on top of the virtual machine 824, and one or more dynamic applications 826 run on top of the application server 826. An application server is software that facilitates the running of applications on a data processing system, and a dynamic application is simply an application that is written in a dynamically compiled language.

The architecture 800 also includes a monitoring infrastructure 810. The monitoring infrastructure 810 comprises software that observes and records events from each layer in the execution stack 812. Such events may include events from hardware layer 814, hypervisor layer 816, operating system layer 818, libraries 820, native application(s) 822, virtual machine 824, application server 826 and dynamic application(s) 828. The monitoring infrastructure 810 gathers data about runtime behavior and the execution environment, which is then collected and analyzed by the CPO online agents 808. Although shown as a single block 810 for ease of illustration, one skilled in the art will appreciate that monitoring infrastructure 810 will typically comprises a plurality of different data-gathering components or modules.

In one embodiment, each CPO online agent 808 is adapted to interface directly with one or more of the data-gathering modules or components of the monitoring infrastructure 810 to obtain the data it needs to carry out its analysis. However, in a preferred embodiment, the monitoring infrastructure 810 comprises a performance environment monitoring (PEM) software utility 811. PEM software utility 811 comprises a plurality of application program interfaces (APIs) that interact with the data-gathering components and modules of the monitoring infrastructure 810. A monitoring infrastructure 810 which comprises a PEM software utility 811 can define one or more events to provide a unified specification; register one or more events to be detected; detect an occurrence of at least one of the registered event or events; generate a monitoring entry each time one of the registered events is detected; and enter each of the monitoring entries generated into a single logical entity. The CPO online agents 808 can then access the data needed for their analysis from the single logical entity. This significantly simplifies programming of the CPO online agents 808, since each such agent can be programmed with a common interface to the single logical entity provided by the PEM software utility 811, rather than having to be individually programmed to interface with a specific data-gathering module or component. An exemplary implementation of a PEM software utility is described in Appendix A hereto and in co-pending U.S. patent application Ser. No. 11/137,293 filed on May 25, 2005 and which is hereby incorporated by reference herein in its entirety.

In the particular embodiment shown, the PEM 811 does not form part of the CPO 802; in other embodiments the PEM 811 may form part of the CPO 802. In addition to its interaction with the CPO online agents 808 (described further below), the PEM 810 provides data through offline loop 842 to an event trace database 860, which is data storage used by a performance environment trace visualizer 862. Performance environment trace visualizer 862 is a software application which presents performance environment tracing data to a user by means of a graphical user interface (GUI) so that the user may more easily understand and analyze the data.

The exemplary architecture 800 also includes a static compiler 864 and a post-link optimizer 868. Both the static compiler 864 and the post-link optimizer 868 are computer software programs used with statically compiled languages. In particular, the static compiler 864 will compile source code for a computer program written in a statically compiled language into executable code, and the post-link optimizer 868 may carry out further optimization (compiling) on the resulting executable code. The executable code may then be provided to the execution stack 812. As shown in FIG. 8, the static compiler 864 and the post-link optimizer 868 may use information obtained from the CPO database 806.

As described above, the CPO 802 operates on target program code in order to improve performance of that program code while the code is executing. Such program code may result from static compilation of source code written in a statically compiled language, from dynamic compilation of source code written in a dynamically compiled language, or a combination of the two. Operation of exemplary CPO 802 within exemplary architecture 800 will now be described.

The CPO online agents 808 carry out online (i.e. while the target program code is executing) analysis and optimization of the target program code. The monitoring infrastructure 810 collects information from across the entire execution stack 812, and feeds this information to the CPO online agents 808 through the online loop 840. The CPO online agents 808 use the online loop 840 to direct the data collection activities of the monitoring infrastructure 810. The CPO online agents 808 also receive data from the CPO database 806 to coordinate their optimization activities. In particular, the CPO database 806 serves as a managing entity to prevent adverse interactions among the CPO online agents 808. For example, there may be cases where an apparently advantageous action by a first CPO online agent 808 would in fact be disadvantageous because of an action already taken by a second CPO online agent 808. The CPO database 806 can provide data in respect of the actions of the second CPO online agent 808 to the first CPO online agent 808 so that the first CPO online agent 808 will not take the apparently advantageous but actually disadvantageous action.

When one of the CPO online agents 808 identifies a performance improvement opportunity in an executing application, it directs a dynamic compiler 809 to carry out any required dynamic recompilation of the relevant regions. The dynamic compiler 809 may recompile regions within the libraries 820, native applications 822, dynamic applications 828, and application server 826, in each case as directed by one of the CPO online agents 808. Optionally, the dynamic compiler 809 may also recompile regions of the virtual machine 824 if directed to do so by a CPO online agent. Additionally, the CPO agents may exercise direct control over the hypervisor 816, operating system 818, libraries 820, native applications 822, virtual machine 824, dynamic applications 828, and application server 826 to improve system performance. For example, a CPO online agent 808 could direct the operating system 818 to reserve a specified amount of physical memory for large pages, or could direct a native application 822 or dynamic application 828 to prioritize requests from a first queue over requests from a second queue. In certain embodiments, the CPO online agents 808 may be empowered to direct the operation of hardware, for example by directing the hardware to turn a functional unit on or off. In one particular embodiment, a CPO online agent 808 may direct the dynamic compiler 809 to recompile regions of itself, and/or regions of other CPO online agents.

In addition to directly analyzing and recompiling regions of program code during execution thereof, the CPO online agents also interact with the CPO offline agents 804 to enable offline activities in support of performance improvement. For example, a CPO online agent 808 may identify a region of code for which application of a performance improvement algorithm might result in either improved or hindered performance of the program code, and for which the analysis required to determine the expected effect is too expensive (from a processing perspective) to be carried out during execution. The CPO online agent 808 can communicate this information to the CPO offline agents 804, which can then carry out the required analysis once the target program code has finished executing. The CPO offline agents 804 can then communicate the results of their analysis back to the relevant CPO online agent 808, which can take the appropriate action when the target program code is executed again. For example, if application of a particular performance improvement algorithm were determined to be desirable, the relevant CPO offline agent 804 can communicate this information to the relevant CPO online agent 808, which can then apply the algorithm to recompile the relevant region when the target program code is next executed. Alternatively, the CPO offline agents may communicate the information to the static compiler 864 and/or post-link optimizer 868, which will be discussed further below. As can be seen in FIG. 8, the CPO offline agents 804 share information with the CPO database 806 and vice versa to support each other's functions. For example, the CPO offline agents 804 may communicate the results of a particular offline analysis, or information about activities undertaken by the CPO online agents 808 during execution, to the CPO database 806 so that the CPO database 806 can update its analysis records and/or optimization records. Conversely, the CPO database 806 may communicate certain optimization directives to the CPO offline agents 804 to facilitate their analyses.

In addition to its interaction with the CPO online agents 808, the CPO offline agents 804 may also provide direction to the static compiler 864 and/or the post-link optimizer 868. In particular, the CPO offline agents 804 may gather information from the event trace database 860 and analyze this information to identify optimizations that are best carried out statically (i.e. not during execution) by the static compiler 864 and/or the post-link optimizer 868. The CPO offline agents 804 could then direct the static compiler 864 and/or the post-link optimizer 868 to carry out these optimizations either immediately, or the next time the user compiles the target computer program. Alternatively, an option to carry out the optimization actions may be communicated to a user of the data processing system. As part of carrying out these optimizations, the static compiler 864 and the post-link optimizer 868 may access information from the CPO database 806. This process, wherein the CPO offline agents 804 direct the static compiler 864 and/or the post-link optimizer 868 to (statically) carry out certain optimizations based on information collected during runtime may be referred to as "feedback-directed optimization" or "profile-directed feedback" (PDF).

Methods, computer program products and data processing systems operating according to aspects of the present invention may, depending on particular circumstances, permit richer profile directed optimization opportunities without imposing the burden of gathering profile data from representative input on the part of the user. In addition, the use of methods, computer program products and data processing systems operating according to aspects of the present invention may also permit exploitation of new hardware features by existing statically built software as soon as the hardware and proposed runtime compilation system is available, and without any intervention on the part of the original creator of that software. This in turn may enable central processing unit (CPU) designers to make more radical or frequent changes to their designs without having to wait until the new features are ubiquitous to see them leveraged by computer software, and without the burden of attempting to ensure that new hardware designs will support existing executable program code. In addition, methods, computer program products and data processing systems operating according to aspects of the present invention may allow programmers to integrate modules written in languages with very different execution models, e.g., statically compiled (such as C) and dynamically compiled (such as Java) modules with closer integration and optimization potential.

The invention can take the form of an entirely software embodiment or an embodiment containing both hardware and software elements. For example, profile data can be gathered from hardware performance counters. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

APPENDIX A

Implementation of a Performance Environment Monitoring Software Utility

Figure 9:
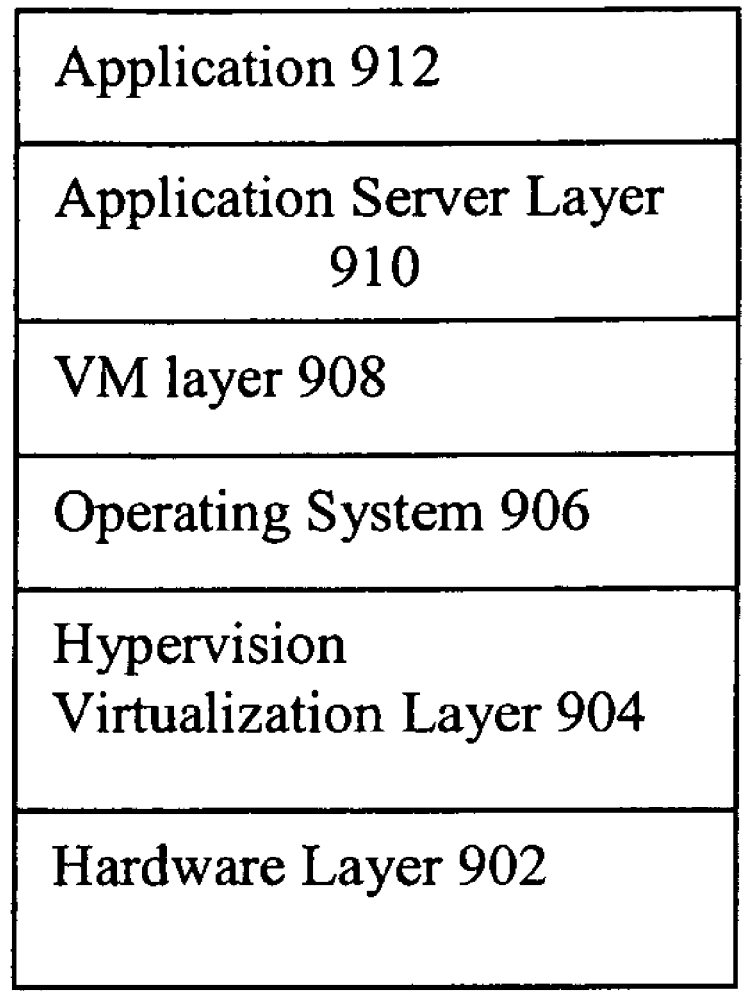
FIG. 9 shows the execution layers that make up a typical computer system, including hardware and software layers.

FIG. 9 shows an execution stack of a computer system. The execution layers of the shown computer system include a hardware layer 902, such as IBM's POWERPC or Intel's Pentium architecture, a hardware virtualization layer 904 such as a hypervisor or virtual machine monitor (VMM), an operating system 906 such as IBM's AIX or Microsoft's Windows XP operating system, a language runtime layer 908, such as the Java virtual machine, an application server layer 910, such as the IBM® WebSphere® product, and the application layer 912, such as transaction software. Different execution stacks can have a combination of these layers, a minimal configuration comprising a hardware layer, an operating system layer, and an application layer. Each of the layers in an execution stack will generate multiple events during its execution. Examples of events are cache misses from the hardware layer, page fault events from the operating system layer, or transaction completion events from the application layer.

Figure 10:
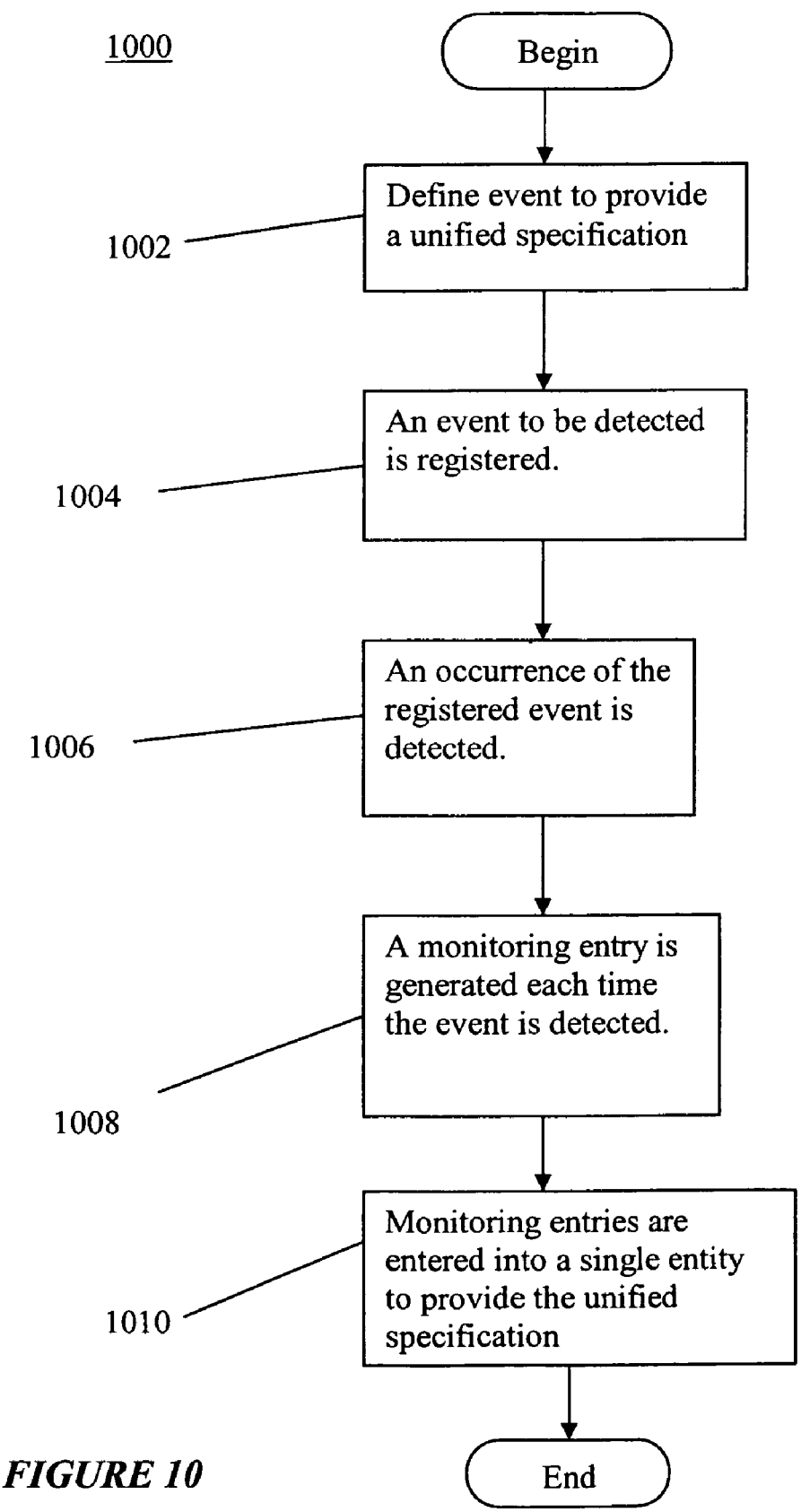
FIG. 10 is a flow chart of a method according to an embodiment of a performance environment monitoring software utility.

Referring to FIG. 10, there is shown a flow chart illustrating an information processing method 1000 for creating a unified specification for monitoring a computer system. According to this embodiment, the method uses an API. The method begins at step 1002 where an event is defined to provide a unified specification. A global definition of events can be done during or before runtime. In step 1004, the defined event is registered for detection. In step 1006, an occurrence of the registered event is detected. In step 1008, a monitoring entry is generated each time the event is detected. In step 1010, monitoring entries are entered into a single logical entity. A single logical entity allows monitored events to be globally time stamped. Global time stamps allow events from different execution layers to be correlated, providing a means to help understand cause and effect relationships between events.

Figure 11:
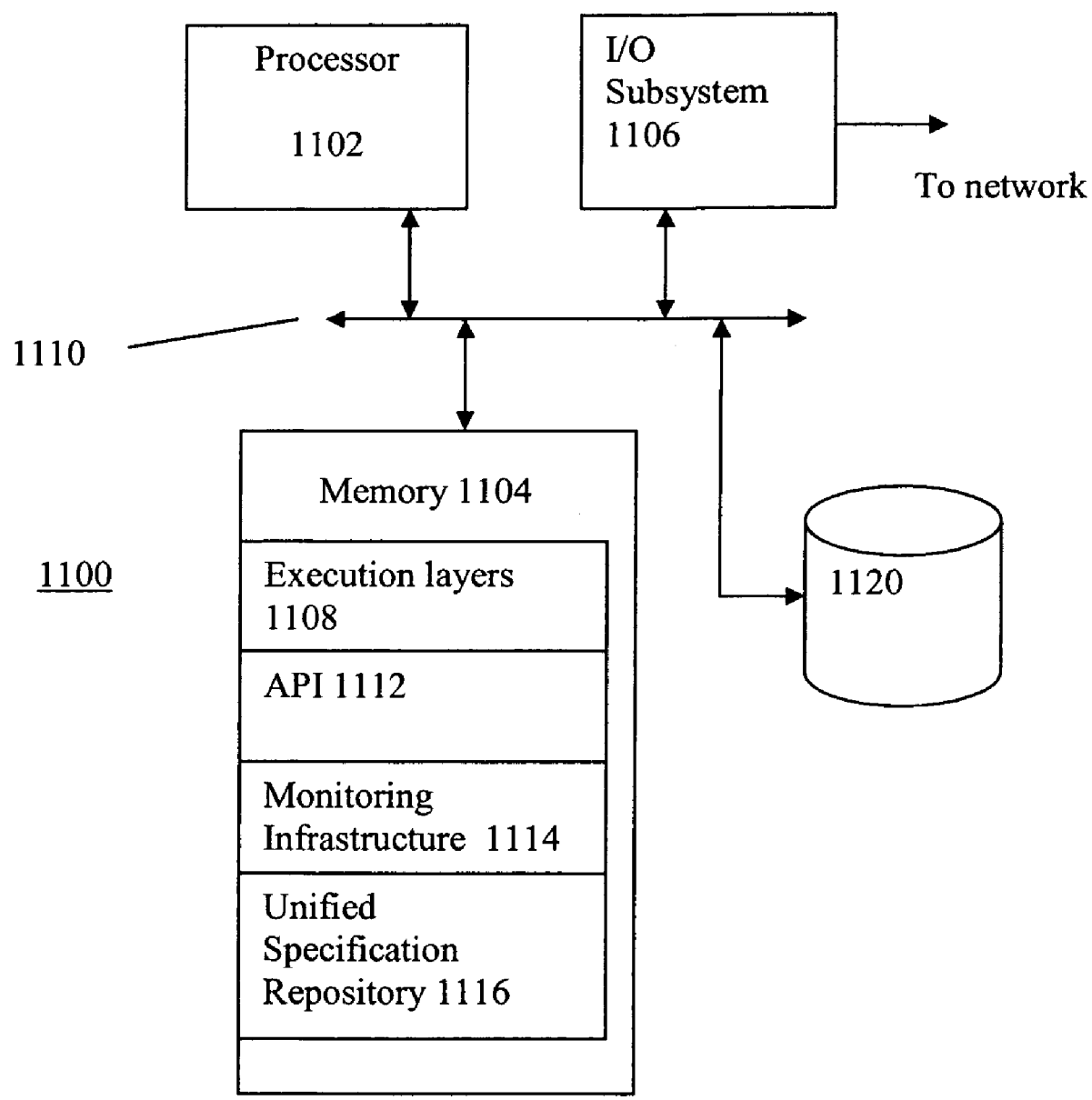
FIG. 11 is a high level block diagram showing an information processing system according to an embodiment of a performance environment monitoring software utility.

Referring to FIG. 11, there is shown a block diagram of an information processing system 1100. The system 1100 comprises a processor 1102, a memory subsystem 1104, an input/output (I/O) subsystem 1106, and a mass storage subsystem 1120. These are linked by a bus 1110. The I/O subsystem 1106 may further comprise a connection to a network such as a local-area network (LAN) or wide-area network (WAN) such as the Internet.

The memory subsystem 1104 contains a set of execution layers 1108 such as those depicted in FIG. 9. The memory 1104 further comprises an API 1112 according to an embodiment of the invention. The memory subsystem 1104 further comprises a monitoring infrastructure 1114 and a unified specification repository 1116. What has been shown and discussed is a highly-simplified depiction of a programmable computer apparatus. These components are discussed further herein. Those skilled in the art will appreciate that other low-level components and connections are required in any practical application of a computer apparatus.

According to one embodiment, a computer readable medium, such as a CD-ROM, can include program instructions for operating the programmable computer 1100 according to the invention.

An embodiment of a PEM comprises an API for integrated performance event monitoring across the execution layers of a computer system. The API is an interface implemented by the underlying performance monitoring infrastructure that provides a protocol for the cooperation between two types of monitoring clients: (1) event producers that generate monitoring information, and (2) event consumers that process and regulate the information that is monitored.

Figure 12:
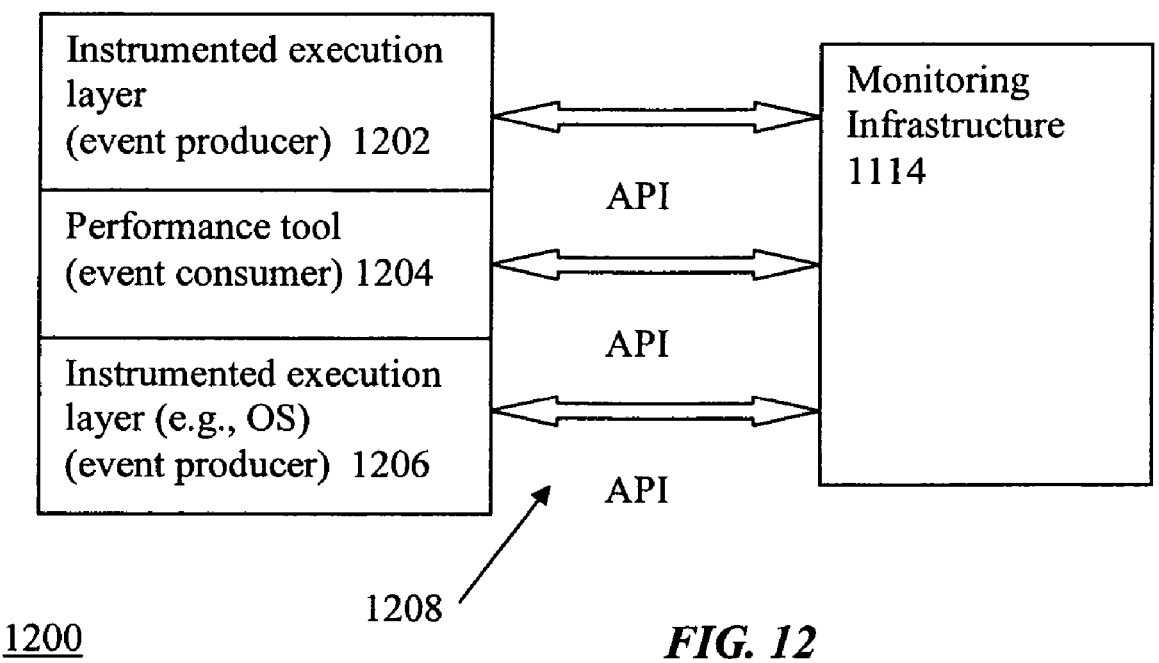
FIG. 12 shows how a monitoring infrastructure interfaces with event producers and consumers through an application programming interface (API)

In FIG. 12, a block diagram 1200 illustrates how event producers are interfaced with event consumers through an API 1208. An event producer is an execution layer that emits performance events to the monitoring infrastructure through the API. In FIG. 12, the instrumented execution layers 1202 and 1206 are event producers. Every existing execution layer can be instrumented, either statically, or dynamically, or both, with API event notification calls to become an event producer. A performance tool 1204 that is built using the API to automatically analyze and process event information is an example of an event consumer. The API 1208 supports both offline and online event consumers. Offline event consumers post-analyze a trace of events that was generated through the API 1208 at runtime. Online event consumers use the API to immediately process the event information for use in online performance tuning tools. Using the API 1208, clients (i.e. event producers and offline and online event consumers) can be built to implement specific performance monitoring tasks, such as global logging of events or online event processing for performance tuning.

Embodiments of the API can include the following features.

Vertical event integration and correlation: The API 1208 using the invention provides a uniform way to relate performance events from different layers. For example, through the API 1208 one can correlate events from the Java virtual machine (such as an instance of garbage collection) with performance events in the operating systems (such as lock contention and delays).

Online processing: The API 1208 provides programming constructs for online event processing. The API 1208 provides basic monitoring abstractions for event processing. By specifying event processing logic through the API 1208, the raw event stream may never have to be stored and traced in its complete volume. Instead, through the API 1208 the tool developer can instruct the monitoring infrastructure to directly process the event information and expose only the processed instead of the raw event stream to the tool.

Virtualization: The API 1208 provides means to specify a virtualization context to differentiate performance events coming from different entities in the system. The virtualization context of an event includes the responsible O/S thread and process and underlying CPU. For example, when tracking performance events from the operating system (e.g., page faults), the tool may only be interested in those events attributed to the application thread on which the tool is focusing. In this example, the application thread defines the virtualization context.

Platform-independence: The API 1208 is platform-independent. All platform-dependent aspects of event monitoring are made transparent by the API implementation, thus clients interested in the performance monitoring data can consume traces from different architectures.

Dynamic monitoring: The API 1208 provides interfaces for light-weight instrumentation in the producer layers. Monitoring activity can be dynamically enabled and disabled through API calls in a consumer tool.

Through the above discussed capabilities, the API 1208 provides a flexible framework for building monitoring client tools. The API 1208 provides monitoring abstractions for easy and fast programming of tools that remove the burden of monitoring implementation. New monitoring tasks can be implemented in a tool without having to make additional changes in the participating executing layers.

The API 1208 provides three generic performance monitoring abstractions: events, event statistics, and event callbacks. An event is a basic abstraction of the API 1208 and denotes occurrences of a performance phenomenon in the system. The API allows the monitoring of a specific event type to be dynamically enabled or disabled. Event statistics are functions on a stream of events. An example of an event statistic is an event counter that is incremented each time an event of a specific type occurs. Other examples include average value computation or computing histograms. The API 1208 includes basic operations on the statistics, such as reading or resetting the current value of the statistic.

An event callback is a routine that, through the API, can be installed to be invoked in response to the occurrence of specific events or event statistics. An event callback is analogous to an interrupt handler that is called in response to an interrupt.

A specific embodiment of the invention may in addition include custom composite interfaces for common combinations of the basic abstractions to allow for more efficient implementation of these combinations on a certain platform.

By providing the above facilities the API 1208 facilitates the construction of tools for both online automatic performance tuning and offline performance tracing. By providing basic monitoring abstractions to the tool developer across all execution layers, the API 1208 hides implementation details of the execution layer in which the event occurs, such as the code location where the event was raised. Thus, proprietary execution layers can participate in event monitoring by issuing selected events into monitoring infrastructure without having to expose any of the underlying proprietary execution layer code structures. Overall, the API 1208 provides a fully integrated and uniform view of performance events across the entire execution stack.

According to this embodiment that demonstrates the advantages of using this API mechanism over other techniques, the API 1208 can be implemented as part of a performance and environment monitoring infrastructure. The embodiment provides the following abstractions for programming monitoring clients:

Event abstraction: An event is any type of an action taken by a system. Examples of events are: cache misses, page faults, operating system interrupts, garbage collection invocations, dynamic compiler invocations, and transaction completions. An eventSet is a grouping of events into a set. All the events in a set can be handled as a single entity (e.g., a single part of memory such as a buffer). Sets of events are a convenient abstraction for operating on a group of events such that all the events are accessed and manipulated through a single API call. Operations include starting, stopping, resetting, and reading an event or a set of events. An event attribute is a datum associated with an event. For example, a page fault event may have as an attribute the address that caused the page fault.

Event statistics and event statistics operations: Allows monitoring clients to create and operate on (sets of) event statistics across execution layers. Statistics are types of statistical event functions such as counters.

Event callback abstraction: This allows monitoring clients to specify custom reactions to an event notification. Through the callback mechanism the client can specify arbitrary computation to occur when an event notification call is made from an event producer.

Events are specified in a system-wide generic event specification format. Based on the event specification, a set of tools is built to process the event specification in order to generate programming language-specific files and stubs.

Figure 13:
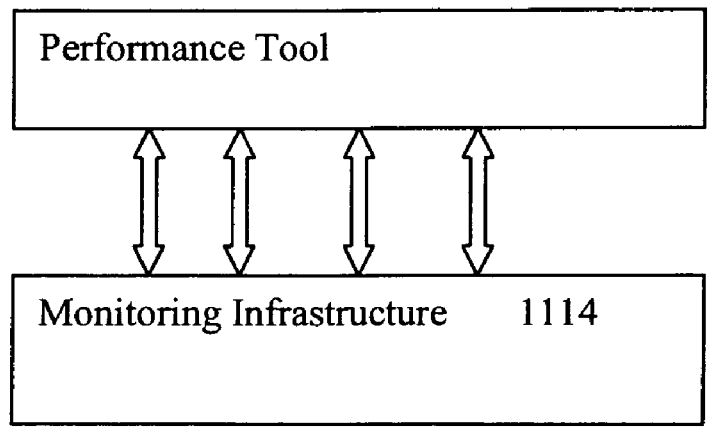
FIG. 13 shows how a performance analysis tool can be built on top of a monitoring infrastructure that exposes an API.

FIG. 13 shows a performance analysis tool built on top of the monitoring infrastructure 1114 that exposes an API.

FIG. 14 provides an overview of the main interfaces of the API 1208. These interfaces are discussed in detail in the following discussion.

Context

The preferred embodiment allows a monitoring consumer to constrain the scope of monitoring by a specified context; that is, specifying the state that the system must be in when an event occurs for that event to be monitored. Each monitoring client determines the context for the events which it is interested in. For example, a context may be specified as a tuple <cpuid, pid, tid> that specifies system state as the CPU (cpuid), process (pid) and thread (tid) identifiers. Any element of the tuple can be specified as UNRESTRICTED; that is, monitoring will not be constrained by this element. Therefore, system-wide monitoring is specified by <UNRESTRICTED, UNRESTRICTED, UNRESTRICTED>, CPU specific monitoring is specified by <cpuid, UNRESTRICTED, UNRESTRICTED>, process specific monitoring for a particular CPU is specified by <cpuid, pid, UNRESTRICTED>, and thread specific monitoring for a particular process and CPU is specified by <cpuid, pid, tid>. If process and thread migration across CPUs is allowed, then the CPU component for both process and thread specific monitoring can be specified as UNRESTRICTED. Alternative tuple items may be required to identify context. For example, in the context of a parallel application that uses message passing interface (MPI), an MPI thread identifier might be more appropriate than operating system thread identifier. Additional tuple items may be required to identify context. For example, in the context of a Java virtual machine, a Java thread identifier may be required in addition to an operating system thread identifier. The context of an event may further be constrained by spatial limitation of the event scope. For example, memory related events (e.g., a cache miss) may be constrained by a specific memory region to which they refer. Other examples include restricting events by the code region in an application where the events occur, or restricting the events to a set of data structure addresses that are responsible for generating the events.

Event Specification

The monitoring API is based on a unified event specification repository 1116 (in FIG. 11). In one embodiment, the repository contains a definition of each event and its attributes in programming language-independent format using XML (extensible markup language) format, however other formats for specifying the event repository are possible. The XML definitions are used to automatically generate event-specific interfaces and header files in one or multiple programming languages (e.g., C, C++, Fortran, Java, etc.).

The XML specification results in the automatic generation of a record structure definition for the event and various function interfaces as shown in the following sections.

Monitoring Producers

A monitoring producer may be any layer or component of a layer in the execution stack (see FIG. 9). To interact with the monitoring infrastructure, a monitoring producer is instrumented with event notification calls. Instrumenting the producers can be done manually or automatically (for example, through a compiler). No other modifications to a layer are necessary to support monitoring. The actions taken to process an event notification call in the monitoring infrastructure are fully programmable through the preferred embodiment functions. In this sense, a producer is passive and only notifies about the occurrence of a particular event in a particular context if the producer has been programmed to react.

Event notification signals to the monitoring infrastructure that an event has occurred and provides a mechanism to pass specific event attributes to the monitoring infrastructure.

Actions that take place to process an event notification call are now discussed. When an event notification call is made, the current context tuple consisting of a cpu id, a process id and a thread id is determined. If no event logging, statistics or callback has been registered by a monitoring consumer for the current context, the event notification call does nothing. If a consumer has registered event logging for this event in the current context, and if the corresponding logging handle has been enabled then an event record is written into an event buffer or to disk.

If a consumer has registered an event statistics for this event in the current event context, and if the statistic has been enabled, then the statistics is updated by applying the statistics function to the current event. Finally, if a consumer has registered an event callback for this event in the current event context, and if the callback has been enabled then the callback function will be invoked.

The preferred embodiment provides event-specific notification interfaces that are automatically generated from the XML event specifications. An event-specific notification explicitly passes as arguments the attributes of the event. A concrete embodiment of the notification interface for the page fault event may be specified as follows:

notifyPageFaultEvent(attr_type threadPtr, attr_type faultAddr, attr_type faultIAR);

In this example, the page fault event has as event attributes, which are passed as arguments (of type: attr_type), a pointer to the thread that was executing when the page fault occurred (threadPtr), the address that caused the page fault (faultAddr), and the faulting instruction address (faultIAR).

Monitoring Consumer

Through the preferred embodiment a monitoring consumer can program a specific reaction to an event notification. The consumer can specify both the context and level of detail of the event. For example, a tool may specify both the process and the thread identifier of a specific application process because it is interested in only the page faults generated by that process and not in the page faults generated by other applications that happen to be executing at the same time. On the other hand, an operating system may specify only a CPU identifier because it is interested in all the page faults that are generated by any application executing on that processor.

The level of detail of an event determines the amount of information that is made available about that event. For example, a consumer might want an event and all of its attributes to be saved every time that the event executes, while another client might only want to count the number of times the event occurs, or to compute the maximum value of one of the attributes of an event The preferred embodiment provides two levels of details: logging and statistics. At the logging level, whenever the event occurs in the specified context, the event and its attributes are saved as a log record. At the statistics level, whenever the event occurs in the specified context, an operation is executed that summarizes the event. The operation may count the number of times this event occurs, or compute the maximum, minimum, or average values of one of the event's attributes, or any other statistical measure of interest. To simplify usage, the preferred embodiment provides the data abstraction of a handle for logging and statistics. A handle identifies a set of events, identifies the context for that set, encapsulates the necessary storage that is required to monitor the event set, and encapsulates the operations that can be applied to the storage. For example, at the statistic level, the handle encapsulates the statistics operation and the location that holds the current statistics value. A monitoring consumer accesses the monitored data through the handle. If several handles have been specified and enabled for the same event, event notification will execute each handle in turn in unspecified order.

Logging

Event logging describes the process of writing an event record based on the event's XML specification into an event buffer. Event logging may be triggered explicitly through calls to event logging functions or implicitly as the event occurs. For both explicit and implicit logging, a timestamp will automatically be inserted into the event record.

Explicit Logging

The preferred embodiment contains explicit event logging interfaces that are automatically generated from the XML event definition. For example, from the XML page fault specification of a page fault event the following concrete interfaces may be automatically generated:

errorCode logPageFalutEvent(attr_type threadPtr, attr_type faultAddr, attr_type faultIAR);

The arguments passed to logPageFaultEvent are the same as for notifyPageFaultEvent. The explicit logging functions may be called from both, monitoring consumers or producers.

Implicit Logging

A monitoring consumer can register a set of events in a particular context at the logging level of detail. Registration returns a logging handle, allocates the necessary data structures needed to log any event in this set, and informs the event notification calls about this handle. The logging registration interface in the preferred embodiment is defined as follows:

handle_type registerLogging(eventSet_type events, context_type context, integer_type sampleRate);

To register an event set for logging, the set of events is passed as the "events" argument (of type eventSet_type). The "context" argument (of type context_type) specifies the context for the event set. Finally, the "sampleRate" argument (of type integer_type) is passed to specify how many times an event in the set must occur in the handle's context before the event is logged for this handle. In particular, if the event set contains two events, A and B, and sampleRate is three, then every third A event is logged and every third B event is logged. Registration of logging returns a logging handle (of type handle_type). The default value of the sampleRate is 1, that is, every event is logged.

Statistics

A monitoring consumer can register a set of events in a particular context at the statistic level of detail. Registration returns a statistics handle, allocates the necessary data structures needed to compute a statistic on any event in the set, and informs event notification about this statistic handle. The logging registration interface in the preferred embodiment is defined as follows: handle_type registerStatistics(eventSet_ type events, context_type context, integer_type sampleRate, statistic_operation_type op, attr_pointer_type attrs);

The "events" argument (of type eventSet_type) specifies the set of events associated with this handle. The "context" argument (of type context_type) specifies the context for the event set. The "sampleRate" argument (of type integer_type) determines how many times an event in the statistics' event set must occur in the handle's context before the statistic is computed on the event. The "op" argument (of type statistic_operation_type) specifies the statistics operation that is to be applied to the "attrs" argument (of type attr_pointer_type), which specifies a list of attributes of the events, one for each event in the event set. The number of entries in attribute list "attrs" must be the same as the number of events in the event set "events". Example of operations include "count", which counts the number of times an event occurs; "max", which computes the maximum value for an attribute of an event; "min", which computes the minimum value for an attribute of an event; and "average" computes the average value for an attribute of an event. The "max", "min", and "average" operators can be considered a generalization of counting. Other statistics such as standard deviation, etc., are considered as consistent with this embodiment. Registration of a statistic returns a statistics handle (of type: handle_type).

Callback

A monitoring consumer can register a callback in a particular context. Registration returns a callback handle, allocates the necessary data structures needed to execute the callback, and informs the event notification calls about this handle. The callback registration interface in the preferred embodiment is defined as follows: handle_type registerCallback(event_type event, context_type context, integer_type sampleRate, (void(*callback)(void*));

The "event" argument (of type event_type) specifies the event associated with this handle. The "context" argument (of type context_type) specifies the context for the event set. The "sampleRate" argument (of type integer_type) determines how many times an event in the set must occur in the handle's context before the event is logged for this handle. The final "callback" argument, which is shown in the "C" programming language syntax, specifies the function that is invoked when the call back is triggered. The callback function is invoked with a pointer to the event log record of the event that triggered the callback. Registration of a callback returns a callback handle (of type handle_type).

Handle Operations

The registration of logging, statistics and callback returns a handle to the monitoring consumer. The consumer can use a handle interface, provided by the preferred embodiment, to trigger operations on the handle objects. The preferred embodiment interface includes the following handle operations:

Enable: After a handle has been created through registration, the handle can be enabled. Once the handle is enabled, whenever an event notification for an event in the handle's event set is executed in the handle's context with the handle's specified number of times for this event, the handle's action is applied to the event. For a logging handle, the action is that the event and all of its attributes are logged. For statistics handle, the action is that the handle's operation is applied to the handle's accumulator for the event. For callback handle, the action is a function call that passes the event as a parameter.

Disable: After a handle has been enabled, the handle can be disabled. No action is taken for a disabled handle. That is, whenever a handle's event occurs in the handle's context and an event notification call executes, then no action is taken for this handle. It is a null operation to disable a handle that has not been enabled.

Read: After a handle has been enabled, the handle's internal data structure is read through this operation. For a logging handle, the values returned are all the records that have been logged for this handle. For a statistics handle, the values returned is an array of statistics values, one for each event in the event set with which the statistics was registered. Callback handles do nothing if read.

Reset: This operation resets the internal data structures for the handle. Resetting a logging handle eliminates all previous log records for this handle. Resetting a statistics handle resets all values associated with the handle.

Unregister: After a handle has been created through registration, the handle can be unregistered; that is, the handle is disabled and the data structures associated with the handle are released. After a logging handle is unregistered, if an event in the handle's event set occurs in the handle's context, no event is logged for this handle. After a statistics handle is unregistered, if an event in the handle's event set occurs in the handle's context, no statistics are computed for this handle. After a callback handle is unregistered, if an event in the handle's event set occurs in the handle's context, no function is called for this handle. After a handle is unregistered, any operation that is applied to that handle is a runtime error.

EXAMPLES

There are now provided a number of examples of how the preferred embodiment of a PEM can be used.

System-wide Monitoring

This example demonstrates how to use the interface to log every event that occurs in the system. Assume the event set "AllEvents" contains all events that are specified in the Unified Specification Repository 1116; that is, AllEvents={page faults. "AllEvents" is defined by the tools that process the XML event specification. Assume further that "GlobalContext" is defined to specify system-wide context; that is, all of the context's items are defined as UNRESTRICTED.

handle_type allEvents=registerLogging(AllEvents, GlobalContext, 1); allEvents.enable( );

After allEvents is enabled, whenever any event in the set AllEvents occurs, it is automatically logged. To stop system-wide logging, the allEvents handle is disabled. The log records can be read by calling the read operation. Finally, the handle's internal data structures that captured the logged events are released when the handle is unregistered.

allEvents.disable( );
    log=allEvents.read( );
    allEvents.unregister( );

Process Specific Monitoring

We now discuss an example of how to monitor process specific events. In this example, the operating system (OS) is the monitoring consumer that is interested in monitoring the events associated with a Java virtual machine (JVM). After starting the JVM, the OS creates a statistics handle by registering the JVM's process identifier to count the JVM process specific events. After a statistics handle is created, the handle is enabled. Events for other processes that are running concurrently with the JVM are not recorded with the JVM's handle.

JVM_process=startExec(JVM);
    context_type JVM_specific={UNRESTRICTED, JVM_process, UNRESTRICTED};

```
    statistics_type jvm=registerStatistics(AllEvents, JVM_
        specific, 1, count, null);
    error_type error=jvm.enable( );
```
After the OS destroys the JVM process, the statistics are disabled, read, and finally the handle is unregistered.
```
    destroy(JVM_process);
    error=jvm.disable( )
    void *stats=jvm.read( )
    error=jvm.unregister( )
```
Thread Specific Monitoring There is now discussed an example of how to monitor thread specific events. In this example, a Java virtual machine (JVM) is the monitoring client.

In particular, the JVM is interested in monitoring the events associated with one of its threads. After creating a thread, the JVM registers the set of Java thread events in a thread specific context. We assume that JavaThreadEvents is defined by the tools that process the XML event specification, and it identifies all of the events associated with a Java thread.
```
    // The XML specification for JavaThreadEvents is not
        shown here
    JVM_thread=createJavaThread( . . . );
    context_type thread_context={UNRESTRICTED, JVM_
        process, JVM_thread};
    statistics_type jvmThread=registerStatistics(JavaThread-
        Events, thread_context, 1, count, null);
    error_type error=jvmThread.enable( );
```
The jvmThread handle is disabled, read, and unregistered before the Java thread is destroyed.
```
    // inside of JVM
    error=jvmThread.disable( );
    void *stats=jvmThread.read( )
    error=jvmThread.unregister( )
    destroyThread(JVM_thread);
```
Interval Monitoring: Garbage Collection.

There is now discussion of an example of how to aggregate a set of events E that occur between a pair of marker events M. The pair of events M defines an interval during which the events E are aggregated. In this example, the monitoring client is a Java virtual machine (JVM). The interval is defined by the garbage collection (GC) start and end events. The events E that are aggregated during a GC are the number of page faults, and the number of data cache misses. An event set, events, is defined to contain these two aggregated events. The event set is registered as a statistic with the count operation. A process specific context is created for this JVM. A callback is registered for the start of a GC with the gcStartEvent event for this JVM with the jvmContext context such that when the JVM starts a GC the function gcStart is invoked with the gcStartEvent log record passed as the first parameter. The function enables and resets the stats handle which counts the number of page fault and data cache misses, and saves the timestamp of the GC start event. A callback is registered for the end of a GC with the gcEndEvent event for this JVM with the jvmContext context such that when the JVM ends a GC the function gcEnd is invoked with the gcEndEvent log record passed as the first parameter. The function disables the stats handle and then logs a GC interval event, gcIntervalEvent, that contains the log record for the GC end event, the time stamp of the start of the interval and the number of page faults and cache misses that occurred during the GC. After both callback handles are enabled, a callback will be triggered whenever this JVM starts or ends a GC.

When the JVM is no longer interested in counting the number of page faults and data cache misses that occur during a GC, the handles are unregistered.

```
    // The XML specifications for the events gcStartEvent and
        gcEndEvebt are not
    // shown here
    eventSet_type events={pageFault, dataCacheMissEvent};
    statistics_type stats=registerStatistics(events, JVM_spe-
        cific, 1, count, null);
    timestamp_type gcStartTime=null;
    context_type jvmContext={UNRESTRICTED, myPro-
        cessId( ), JVM_thread};
    handle_type gcStartHandle=registerCallBack(gcStart,
        jvmContext, 1, gcStart( ));
    handle_type gcEndHandle=registerCallBack(gcEnd, jvm-
        Context, 1, gcEnd( ));
    gcStartHandle.enable( )
    gcEndHandle.enable( );
    . . .
    gcStartHandle.unregister( );
    gcEndHandle.unregister( );
    stats.unregister( );
    . . .
    gcStart(void *record) {
        gcStartRecord *rec=(gcStartRecord *) record;
        gcStartTime=rec->timestamp;
        stats.enable( );
        stats.reset( );
    }
    gcEnd(void *record) {
        stats.disable( )
        long long statsValues[2]=stats.read( );
        timestamp_type gcEndTime=((gcEndRecord *)
            record)->timestamp;
        // the XML specification for GcIntervalEvent is not
            shown here
        logGcIntervalEvent(gcStartTime, gcEndTime, statsVal-
            ues[0], statsValues[1]);
    }
```
Interval Monitoring: Page Faults.

There is now presented another example that shows how callbacks are used to match a pair of events to form an interval. The monitoring client is the operating system (OS). The interval is defined by the start and end of a page fault. Because page faults can be interrupted, care must be taken in how page fault intervals are constructed. In particular, if multiple outstanding page faults can occur at once, we want to make sure that the page fault intervals that are created pair the page fault start and end events correctly. Two callbacks are registered: one that is triggered on a page fault start event, and another on a page fault end event. When a page fault start event occurs, pageFaultStart is invoked and places the page fault start event's log record in a hash table indexed by the thread id threadPtr. When a page fault end event occurs, pageFaultEnd is invoked and generates a page fault interval by looking up the page fault start log record in the hash table that has the same thread identifier and using the page fault start log record's time stamp as the start of the interval. Note that only a subset of the page fault start and end events' attributes are logged.
```
    Hashtable pgflts=new Hashtable( );
    callback_type pageFaultCB=registerCallBack(pageFault,
        GlobalContext, 1, pageFaultStart);
    callback_type pageFaultDoneCB=registerCallBack(page-
        FaultDone, GlobalContext, 1, pageFaultEnd);
    pageFaultCB.enable( );
    pageFaultDoneCB.enable( );
    . . .
    pageFaultStart(void *start) {
        pageFaultRecord *rec=(pageFaultRecord *) start;
        pgflts.put(rec->threadPtr, rec);
    }
```

```
// The XML specification for the PageFaultInterval event is
    not shown here pageFaultEnd(void *end) {
pageFaultRecord *rec=(pageFaultRecord *) end {
PageFaultRecord *start=(PageFaultRecord *)pgflts.get
    (rec->threadPtr);;
If (start !=null) {
    logPageFaultInterval(start->timestamp, rec->times-
        tamp, rec->faultAddr); hash. remove(rec->th
        readPtr);
} else {
    // generate error message!
}
}
```
Histogram Now presented is an example of how a callback can be used to generate a histogram of the pages fault addresses. The monitoring client is the operating system. A callback is registered for a page fault event in the system-wide context. That is, whenever a page fault occurs the function pageFaultHistogram is called, and it is passed the page fault's attributes. The method increments an integer array indexed by the faulting address shifted by the log of the page size. At some later time, the operating system can disable the callback, and examine the array to determine what region of memory has the most page faults.

```
Integer_type memory[n_pages];
handle_type cb=registerCallBack(pageFaultEvent, Glo-
    balContext, 1, pageFaultHistogram( );
pageFault.enable( )
...
pageFaultHistogram(void *record) {
    pageFaultRecord *rec=(pageFaultRecord *) record;
    integer_type            pageindex=rec-
        >faultAddr>>LOG_PGFLT_SIZE;
    memory[pageIndex]++;
}
```
Periodic Monitoring Now discussed is how a callback can be used to periodically log hardware performance monitor event values. The monitoring client is the operating system. A callback is registered to call a method every ten million cycles in the system-wide context, GlobalContext. That is, whenever ten million cycles execute the method periodic is called.

The method logs a periodic interval that contains the hardware performance monitor values, skipping the logging of the first cycleEvent.

```
statistics_type hpmCounters=registerStatistics({Cycles,
    Instructions, L1 DataCacheMiss, branchMisses}, Glo-
    balContext, 1, count, null);
handle_type periodic=registerCallBack(cycleEvent, Glo-
    balContext, 10000000, periodic);
boolean firstPeriod=true;
periodic.enable( )
...
periodic(void*record) {
    cycleEventRecord *cycle=(cycleEventRecord)record;
    if (firstPeriod) {
        firstPeriod=false;
    } else {
        hpmCounters.disable( )
        long long counterValues[4]=hpmCounters.read( )
        // the XLM specification of the HPMintervalEvent is
            not shown here
        logHPMintervalEvent(cycle->timestamp-10000000,
            cycle->timestamp, counterValues[0],
            counterValues[1], counterValues[2], counterVal-
            ues[3]);
    }
    hpmCounters.enable( );
}
```

Therefore, while there has been described what is presently considered to be preferred or illustrative embodiments, it will be understood by those skilled in the art that other modifications can be made to the PEM.

What is claimed is:

1. A computer-implemented method for improving runtime performance of executable program code when the program code is executed on a data-processing system, the method comprising the steps of, during execution of the program code: (a) collecting runtime program data representing aspects of runtime behavior of the program code and analyzing the runtime program data to identify runtime behavior of the program code; (b) responsive to identification of the runtime behavior of the program code, applying heuristic models to select at least one region of the program code for which application of a performance improvement algorithm is expected to improve runtime performance of the program code and, for each selected region, selecting at least one performance improvement algorithm from a plurality of performance improvement algorithms based on analysis of the runtime behavior of the region; and (c) responsive to selecting, for each selected region, at least one performance improvement algorithm from a plurality of performance improvement algorithms based on analysis of the runtime behavior of the selected region, recompiling each selected region according to the at least one selected performance improvement algorithm for that region to generate a corresponding recompiled region, and modifying the program code so that each subsequently executed invocation of each selected region becomes an invocation of the corresponding recompiled region so as to produce executable modified program code; wherein the method iterates continuously during execution of the program code by recursively returning to step (a) in response to completion of step (c) and applying step (a) to the modified program code.

2. The method of claim 1, wherein the program code is a result of static compilation of source code written in one or more statically compiled computer programming languages.

3. The method of claim 2, wherein the one or more statically compiled computer programming languages is one or more of C, C++, FORTRAN, PL/I, COBOL or Ada.

4. The method of claim 1, wherein the program code is a result of dynamic compilation of source code written in one or more dynamically compiled computer programming languages.

5. The method of claim 4, wherein the one or more dynamically compiled computer programming languages comprises Java.

6. The method of claim 1, wherein the program code comprises a first portion that is a result of static compilation of first source code written in one or more statically compiled computer programming languages and a second portion that is a result of dynamic compilation of second source code written in one or more dynamically compiled computer programming languages.

7. The method of claim 6, wherein: the one or more statically compiled computer programming languages comprises one or more of C, C++, FORTRAN, PL/I, COBOL or Ada; and the one or more dynamically compiled computer programming languages comprises Java.

8. The method of claim 1, wherein: step (a) further comprises identifying characteristics of an execution environment of the data processing system; step (b) further comprises, responsive to identification of the characteristics of the execution environment of the data processing system, applying heuristic models to select at least one region of the program code for which modification of the region to adapt the region to at least one of the identified characteristics of the execution environment is expected to improve runtime performance of the program code and, for each such selected region, selecting at least one corresponding identified characteristic of the execution environment; and step (c) further comprises, responsive to selecting, for each such selected region for which modification of the region to adapt the region to at least one of the identified characteristics of the execution environment is expected to improve runtime performance of the program code, at least one corresponding characteristic of the execution environment, recompiling each such selected region to adapt the region to the corresponding at least one characteristic of the execution environment to generate a corresponding recompiled region and modifying the program code so that each subsequently executed invocation of each such selected region becomes an invocation of the corresponding recompiled region so as to produce executable modified program code.

9. The method of claim 8, wherein the characteristics of the execution environment of the data processing system comprise hardware features of the data processing system.

10. The method of claim 8, wherein the characteristics of the execution environment of the data processing system comprise software executing on the data processing system.

11. A computer program product comprising a computer-usable storage medium having computer-usable program code for improving runtime performance of executable target program code when the target program code is executed on a data-processing system, said computer program product comprising: (a) computer-usable program code for collecting, during execution of the target program code, runtime program data representing aspects of runtime behavior of the target program code and analyzing, during execution of the target program code, the runtime program data to identify runtime behavior of the target program code; (b) computer-usable program code for applying, during execution of the target program code, heuristic models to select at least one region of the target program code for which application of a performance improvement algorithm is expected to improve runtime performance of the target program code in response to identification of the runtime behavior of the target program code and computer-usable program code for selecting, during execution of the target program code, for each selected region, at least one performance improvement algorithm from a plurality of performance improvement algorithms based on analysis of the runtime behavior of the region; and (c) computer-usable program code for recompiling, during execution of the target program code, each selected region according to the at least one selected performance improvement algorithm for that region to generate a corresponding recompiled region in response to selecting, for each selected region, at least one performance improvement algorithm from a plurality of performance improvement algorithms based on analysis of the runtime behavior of the selected region, and computer-usable program code for modifying the target program code during execution thereof so that each subsequently executed invocation of each selected region becomes an invocation of the corresponding recompiled region so as to produce executable modified target program code; wherein the computer-usable program code is adapted to, during execution of the program code, continuously recursively commence execution of the computer-usable program code in (a) using the modified target program code as input in response to completion of execution of the computer-usable program code in (c).

12. The computer program product of claim 11, wherein the target program code is a result of static compilation of source code written in one or more statically compiled computer programming languages.

13. The computer program product of claim 12, wherein the one or more statically compiled computer programming languages is one or more of C, C++, FORTRAN, PL/I, COBOL or Ada.

14. The computer program product of claim 11, wherein the target program code is a result of dynamic compilation of source code written in one or more dynamically compiled computer programming languages.

15. The computer program product of claim 14, wherein the one or more dynamically compiled computer programming languages comprises Java.

16. The computer program product of claim 11, wherein the target program code comprises a first portion that is a result of static compilation of first source code written in one or more statically compiled computer programming languages and a second portion that is a result of dynamic compilation of second source code written in one or more dynamically compiled computer programming languages.

17. The computer program product of claim 16, wherein: the one or more statically compiled computer programming languages comprises one or more of C, C++, FORTRAN, PL/I, COBOL or Ada; and the one or more dynamically compiled computer programming languages comprises Java.

18. The computer program product of claim 11, wherein the computer-usable program code further comprises: (d) computer-usable program code for identifying, during execution of the target program code, characteristics of an execution environment of the data processing system; (e) computer-usable program code for applying, during execution of the target program code, heuristic models to select at least one region of the target program code for which modification of the region to adapt the region to at least one of the identified characteristics of the execution environment is expected to improve runtime performance of the target program code in response to identification of the characteristics of the execution environment of the data processing system, and computer-usable program code for selecting, during execution of the target program code, for each such selected region, at least one corresponding identified characteristic of the execution environment; and (f) computer-usable program code for recompiling, during execution of the target program code, in response to selecting, for each such selected region for which modification of the region to adapt the region to at least one of the identified characteristics of the execution environment is expected to improve runtime performance of the program code, at least one corresponding characteristic of the execution environment, each such selected region to adapt the region to the corresponding at least one characteristic of the execution environment to generate a corresponding recompiled region, and computer-usable program code for modifying the target program code during execution thereof so that each invocation of each such selected region becomes an invocation of the corresponding recompiled region so as to produce executable modified target program code; wherein the computer-usable program code is adapted to, during execution of the program code, continuously recursively commence execution of the computer-usable program code in (d) using the modified target program code as input in response to completion of execution of the computer-usable program code in (f).

19. The computer program product of claim 18, wherein the characteristics of the execution environment of the data processing system comprise hardware features of the data processing system.

20. The computer program product of claim 18, wherein the characteristics of the execution environment of the data processing system comprise software executing on the data processing system.

21. A data processing system comprising: a processor; a bus coupled to the processor; a computer usable medium coupled to the bus, wherein the computer usable medium contains a set of instructions for improving runtime performance of executable target program code when the target program code is executed on the data-processing system, wherein the processor is adapted to carry out the set of instructions by causing the data processing system to, during execution of the target program code: (a) collect runtime program data representing aspects of runtime behavior of the target program code and analyze the runtime program data to identify runtime behavior of the target program code; (b) apply, in response to identification of the runtime behavior of the program code, heuristic models to select at least one region of the target program code for which application of a performance improvement algorithm is expected to improve runtime performance of the target program code and, for each selected region, select at least one performance improvement algorithm from a plurality of performance improvement algorithms based on analysis of the runtime behavior of the region; and (c) recompile, in response to selecting, for each selected region, at least one performance improvement algorithm from a plurality of performance improvement algorithms based on analysis of the runtime behavior of the selected region, each selected region according to the at least one selected performance improvement algorithm for that region to generate a corresponding recompiled region, and modify the target program code so that each subsequently executed invocation of each selected region becomes an invocation of the corresponding recompiled region so as to produce executable modified target program code; wherein the processor is adapted to cause the data processing system to, during execution of the target program code, continuously recursively carry out the set of instructions by carrying out the set of instructions in (a), using the modified target program code as input, in response to having carried out the instructions in (c).

22. The data processing system of claim 21, wherein the target program code is a result of static compilation of source code written in one or more statically compiled computer programming languages.

23. The data processing system of claim 22, wherein the one or more statically compiled computer programming languages is one or more of C, C++, FORTRAN, PL/I, COBOL or Ada.

24. The data processing system of claim 21, wherein the target program code is a result of dynamic compilation of source code written in one or more dynamically compiled computer programming languages.

25. The data processing system of claim 24, wherein the one or more dynamically compiled computer programming languages comprises Java.

26. The data processing system of claim 21, wherein the target program code comprises a first portion that is a result of static compilation of first source code written in one or more statically compiled computer programming languages and a second portion that is a result of dynamic compilation of second source code written in one or more dynamically compiled computer programming languages.

27. The data processing system of claim 26, wherein: the one or more statically compiled computer programming languages comprises one or more of C, C++, FORTRAN, PL/I, COBOL or Ada; and the one or more dynamically compiled computer programming languages comprises Java.

28. The data processing system of claim 21, wherein the processor is further adapted to carry out the set of instructions by causing the data processing system to, during execution of the target program code: (d) identify characteristics of an execution environment of the data processing system; (e) apply, in response to identification of the characteristics of the execution environment of the data processing system, heuristic models to select at least one region of the program code for which modification of the region to adapt the region to at least one of the identified characteristics of the execution environment is expected to improve runtime performance of the program code and, for each such selected region, select at least one corresponding identified characteristic of the execution environment; and (f) recompile, in response to selecting, for each such selected region for which modification of the region to adapt the region to at least one of the identified characteristics of the execution environment is expected to improve runtime performance of the program code, at least one corresponding characteristic of the execution environment, each such selected region to adapt the region to the corresponding at least one characteristic of the execution environment to generate a corresponding recompiled region, and modify the target program code so that each subsequent invocation of each such selected region becomes an invocation of the corresponding recompiled region so as to produce executable modified program code; wherein the processor is adapted to cause the data processing system to, during execution of the target program code, continuously recursively carry out the set of instructions by carrying out the set of instructions in (d), using the modified target program code as input, in response to having carried out the instructions in (f).

29. The data processing system of claim 28, wherein the characteristics of the execution environment of the data processing system comprise hardware features of the data processing system.

30. The data processing system of claim 28, wherein the characteristics of the execution environment of the data processing system comprise software executing on the data processing system.

31. A computer-implemented method for improving runtime performance of executable program code when the program code is executed on a data-processing system, the method comprising the steps of, during execution of the program code: (a) identifying characteristics of an execution environment of the data processing system; (b) responsive to identification of the characteristics of the execution environment of the data processing system, applying heuristic models to select at least one region of the program code for which modification of the region to adapt the region to at least one of the characteristics of the execution environment is expected to improve runtime performance of the program code and, for each selected region, selecting at least one corresponding identified characteristic of the execution environment; and (c) responsive to selecting, for each selected region, at least one corresponding characteristic of the execution environment, recompiling each selected region to adapt the region to the corresponding at least one characteristic of the execution environment to generate a corresponding recompiled region and modifying the program code so that each subsequently executed invocation of each selected region becomes an invocation of the corresponding recompiled region so as to produce executable modified program code; wherein the method iterates continuously during execution of the program code by recursively returning to step (a) in response to completion of step (c) and applying step (a) to the modified program code.

32. The method of claim 31, wherein the program code is a result of static compilation of source code written in one or more statically compiled computer programming languages.

33. The method of claim 32, wherein the one or more statically compiled computer programming languages is one or more of C, C++, FORTRAN, PL/I, COBOL or Ada.

34. The method of claim 31, wherein the program code is a result of dynamic compilation of source code written in one or more dynamically compiled computer programming languages.

35. The method of claim 34, wherein the one or more dynamically compiled computer programming languages comprises Java.

36. The method of claim 31, wherein the program code comprises a first portion that is a result of static compilation of first source code written in one or more statically compiled computer programming languages and a second portion that is a result of dynamic compilation of second source code written in one or more dynamically compiled computer programming languages.

37. The method of claim 36, wherein: the one or more statically compiled computer programming languages comprises one or more of C, C++, FORTRAN, PL/I, COBOL or Ada; and the one or more dynamically compiled computer programming languages comprises Java.

38. The method of claim 31, wherein the characteristics of the execution environment of the data processing system comprise hardware features of the data processing system.

39. The method of claim 31, wherein the characteristics of the execution environment of the data processing system comprise software executing on the data processing system.

40. A computer program product comprising a computer-usable storage medium having computer-usable program code for improving runtime performance of executable target program code when the target program code is executed on a data-processing system, said computer program product comprising: (a) computer-usable program code for identifying, during execution of the target program code, characteristics of an execution environment of the data processing system; (b) computer-usable program code for applying, during execution of the target program code, in response to identification of the characteristics of the execution environment of the data processing system, heuristic models to select at least one region of the target program code for which modification of the region to adapt the region to at least one of the characteristics of the execution environment is expected to improve runtime performance of the target program code, and computer-usable program code for selecting, during execution of the target program code, for each selected region, at least one corresponding identified characteristic of the execution environment; and (c) computer-usable program code for recompiling, during execution of the target program code, in response to selecting, for each selected region, at least one corresponding characteristic of the execution environment, each selected region to adapt the region to the corresponding at least one characteristic of the execution environment to generate a corresponding recompiled region, and computer-usable program code for modifying the target program code during execution thereof so that each subsequently executed invocation of each selected region becomes an invocation of the corresponding recompiled region so as to produce executable modified target program code; wherein the computer-usable program code is adapted to, during execution of the target program code, continuously recursively commence execution of the computer-usable program code in (a) using the modified target program code as input in response to completion of execution of the computer-usable program code in (c).

41. The computer program product of claim 40, wherein the target program code is a result of static compilation of source code written in one or more statically compiled computer programming languages.

42. The computer program product of claim 41, wherein the one or more statically compiled computer programming languages is one or more of C, C++, FORTRAN, PL/I, COBOL or Ada.

43. The computer program product of claim 40, wherein the target program code is a result of dynamic compilation of source code written in one or more dynamically compiled computer programming languages.

44. The computer program product of claim 43, wherein the one or more dynamically compiled computer programming languages comprises Java.

45. The computer program product of claim 40, wherein the target program code comprises a first portion that is a result of static compilation of first source code written in one or more statically compiled computer programming languages and a second portion that is a result of dynamic compilation of second source code written in one or more dynamically compiled computer programming languages.

46. The computer program product of claim 45, wherein: the one or more statically compiled computer programming languages comprises one or more of C, C++, FORTRAN, PL/I, COBOL or Ada; and the one or more dynamically compiled computer programming languages comprises Java.

47. The computer program product of claim 40, wherein the characteristics of the execution environment of the data processing system comprise hardware features of the data processing system.

48. The computer program product of claim 40, wherein the characteristics of the execution environment of the data processing system comprise software executing on the data processing system.

49. A data processing system comprising: a processor; a bus coupled to the processor; a computer usable storage medium coupled to the bus, wherein the computer usable storage medium contains a set of instructions for improving runtime performance of executable target program code when the target program code is executed on the data-processing system, wherein the processor is adapted to carry out the set of instructions by causing the data processing system to, during execution of the target program code: (a) identify characteristics of an execution environment of the data processing system; (b) apply, in response to identification of the characteristics of the execution environment of the data processing system, heuristic models to select at least one region of the program code for which modification of the region to adapt the region to at least one of the characteristics of the execution environment is expected to improve runtime performance of the program code, and select, for each selected region, at least one corresponding identified characteristic of the execution environment; and (c) recompile, in response to selecting, for each selected region, at least one corresponding characteristic of the execution environment, each selected region to adapt the region to the corresponding at least one characteristic of the execution environment to generate a corresponding recompiled region, and modify the target program code so that each subsequently executed invocation of each selected region becomes an invocation of the corresponding recompiled region so as to produce executable modified target program code; wherein the processor is adapted to cause the data processing system to continuously recursively carry out the set of instructions by carrying out the set of instructions in (a), using the modified target program code as input, in response to having carried out the instructions in (c).

50. The data processing system of claim 49, wherein the target program code is a result of static compilation of source code written in one or more statically compiled computer programming languages.

51. The data processing system of claim 50, wherein the one or more statically compiled computer programming languages is one or more of C, C++, FORTRAN, PL/I, COBOL or Ada.

52. The data processing system of claim 49, wherein the target program code is a result of dynamic compilation of source code written in one or more dynamically compiled computer programming languages.

53. The data processing system of claim 52, wherein the one or more dynamically compiled computer programming languages comprises Java.

54. The data processing system of claim 49, wherein the target program code comprises a first portion that is a result of static compilation of first source code written in one or more statically compiled computer programming languages and a second portion that is a result of dynamic compilation of second source code written in one or more dynamically compiled computer programming languages.

55. The data processing system of claim 54 wherein: the one or more statically compiled computer programming languages comprises one or more of C, C++, FORTRAN, PL/I, COBOL or Ada; and the one or more dynamically compiled computer programming languages comprises Java.

56. The data processing system of claim 49, wherein the characteristics of the execution environment of the data processing system comprise hardware features of the data processing system.

57. The data processing system of claim 49, wherein the characteristics of the execution environment of the data processing system comprise software executing on the data processing system.

58. A computer-implemented method for improving runtime performance of executable program code when the program code is executed on a data processing system, the method comprising the steps of, during execution of the program code: (a) collecting runtime program data representing aspects of runtime behavior of the program code and analyzing the runtime program data to identify runtime behavior of the program code; (b) responsive to identification of the runtime behavior of the program code, applying heuristic models to select at least one region of the program code for which application of a performance improvement algorithm is expected to improve runtime performance of the program code and, for each selected region, selecting at least one performance improvement algorithm from a plurality of performance improvement algorithms based on analysis of the runtime behavior of the region; and (c) responsive to selecting, for each selected region, at least one performance improvement algorithm from a plurality of performance improvement algorithms based on analysis of the runtime behavior of the selected region, recompiling each selected region according to the at least one selected performance improvement algorithm for that region to generate a corresponding recompiled region, and modifying the program code so that each subsequently executed invocation of each selected region becomes an invocation of the corresponding recompiled region so as to produce executable modified program code; wherein the executable program code is compiled from source code written in one or more statically compiled computer programming languages and omits directives for runtime optimization.

59. The method of claim 58 wherein the executable program code includes runtime checks.

60. The method of claim 58, wherein the one or more statically compiled computer programming languages is one or more of C, C++, FORTRAN, PL/I, COBOL or Ada.

61. The method of claim 58, wherein: step (a) further comprises identifying characteristics of an execution environment of the data processing system; step (b) further comprises applying, responsive to identification of the characteristics of the execution environment of the data processing system, applying heuristic models to select at least one region of the program code for which modification of the region to adapt the region to at least one of the identified characteristics of the execution environment is expected to improve runtime performance of the program code and, for each such selected region, selecting at least one corresponding identified characteristic of the execution environment; and step (c) further comprises recompiling, responsive to selecting, for each such selected region for which modification of the region to adapt the region to at least one of the identified characteristics of the execution environment is expected to improve runtime performance of the program code, at least one corresponding characteristic of the execution environment, each such selected region to adapt the region to the corresponding at least one characteristic of the execution environment to generate a corresponding recompiled region and modifying the program code to replace each invocation of each such selected region with an invocation of the corresponding recompiled region so as to produce executable modified program code.

62. The method of claim 61, wherein the characteristics of the execution environment of the data processing system comprise hardware features of the data processing system.

63. The method of claim 61, wherein the characteristics of the execution environment of the data processing system comprise software executing on the data processing system.

64. A computer program product comprising a computer-usable storage medium having computer-usable program code for improving runtime performance of executable target program code when the target program code is executed on a data-processing system, said computer program product comprising: (a) computer-usable program code for collecting, during execution of the target program code, runtime program data representing aspects of runtime behavior of the program code and analyzing the runtime program data to identify runtime behavior of the program code; (b) computer-usable program code for applying, during execution of the target program code, in response to identification of the runtime behavior of the program code, heuristic models to select at least one region of the program code for which application of a performance improvement algorithm is expected to improve runtime performance of the program code and computer-usable program code for selecting, during execution of the target program code, for each selected region, at least one performance improvement algorithm from a plurality of performance improvement algorithms based on analysis of the runtime behavior of the region; and (c) computer-usable program code for recompiling, during execution of the target program code, in response to selecting, for each selected region, at least one performance improvement algorithm from a plurality of performance improvement algorithms based on analysis of the runtime behavior of the selected region, each selected region according to the at least one selected performance improvement algorithm for that region to generate a corresponding recompiled region, and computer-usable program code for modifying the program code, during execution of the target program code, so that each subsequently executed invocation of each selected region becomes an invocation of the corresponding recompiled region so as to produce executable modified program code; wherein the executable program code is compiled from source code written in one or more statically compiled computer programming languages and omits directives for runtime optimization.

65. The computer program product of claim 64 wherein the executable program code includes runtime checks.

66. The computer program product of claim 64, wherein the one or more statically compiled computer programming languages is one or more of C, C++, FORTRAN, PL/I, COBOL or Ada.

67. The computer program product of claim 64, wherein the computer-usable program code further comprises: computer-usable program code for identifying, during execution of the target program code, characteristics of an execution environment of the data processing system; computer-usable program code for applying, during execution of the target program code, in response to identification of the characteristics of the execution environment of the data processing system, heuristic models to select at least one region of the program code for which modification of the region to adapt the region to at least one of the identified characteristics of the execution environment is expected to improve runtime performance of the program code and computer-usable program code for selecting, during execution of the target program code, for each such selected region, at least one corresponding identified characteristic of the execution environment; and computer-usable program code for recompiling, during execution of the target program code, in response to selecting, for each such selected region for which modification of the region to adapt the region to at least one of the identified characteristics of the execution environment is expected to improve runtime performance of the program code, at least one corresponding characteristic of the execution environment, each such selected region to adapt the region to the corresponding at least one characteristic of the execution environment to generate a corresponding recompiled region and computer-usable program code for modifying the program code, during execution of the target program code, so that each invocation of each such selected region becomes an invocation of the corresponding recompiled region so as to produce executable modified program code.

68. The computer program product of claim 67, wherein the characteristics of the execution environment of the data processing system comprise hardware features of the data processing system.

69. The computer program product of claim 67, wherein the characteristics of the execution environment of the data processing system comprise software executing on the data processing system.

70. A computer-implemented method for improving runtime performance of executable program code when the program code is executed on a data processing system, the method comprising the steps of, during execution of the program code: (a) identifying characteristics of an execution environment of the data processing system; (b) responsive to identification of the characteristics of the execution environment of the data processing system, applying heuristic models to select at least one region of the program code for which modification of the region to adapt the region to at least one of the identified characteristics of the execution environment is expected to improve runtime performance of the program code and, for each such selected region, selecting at least one corresponding identified characteristic of the execution environment; and (c) responsive to selecting, for each such selected region, at least one corresponding characteristic of the execution environment, recompiling each such selected region to adapt the region to the corresponding at least one characteristic of the execution environment to generate a corresponding recompiled region and modifying the program code so that each invocation of each such selected region becomes an invocation of the corresponding recompiled region so as to produce executable modified program code; wherein the executable program code is compiled from source code written in one or more statically compiled computer programming languages and omits directives for runtime optimization.

71. The method of claim 70 wherein the executable program code includes runtime checks.

72. The method of claim 70, wherein the one or more statically compiled computer programming languages is one or more of C, C++, FORTRAN, PL/I, COBOL or Ada.

73. The method of claim 70, wherein the characteristics of the execution environment of the data processing system comprise hardware features of the data processing system.

74. The method of claim 70, wherein the characteristics of the execution environment of the data processing system comprise software executing on the data processing system.

75. A computer program product comprising a computer-usable storage medium having computer-usable program code for improving runtime performance of executable target program code when the target program code is executed on a data-processing system, said computer program product comprising: (a) computer-usable program code for identifying, during execution of the target program code, characteristics of an execution environment of the data processing system; (b) computer-usable program code for applying, during execution of the target program code, in response to identification of the characteristics of the execution environment of the data processing system, heuristic models to select at least one region of the program code for which modification of the region to adapt the region to at least one of the identified characteristics of the execution environment is expected to improve runtime performance of the program code and computer-usable program code for selecting, during execution of the target program code, for each such selected region, at least one corresponding identified characteristic of the execution environment; and (c) computer-usable program code for recompiling, during execution of the target program code, in response to selecting, for each such selected region, at least one corresponding characteristic of the execution environment, each such selected region to adapt the region to the corresponding at least one characteristic of the execution environment to generate a corresponding recompiled region and modifying the program code so that each invocation of each such selected region becomes an invocation of the corresponding recompiled region so as to produce executable modified program code; wherein the executable program code is compiled from source code written in one or more statically compiled computer programming languages and omits directives for runtime optimization.

76. The computer program product of claim 75 wherein the executable program code includes runtime checks.

77. The computer program product of claim 75, wherein the one or more statically compiled computer programming languages is one or more of C, C++, FORTRAN, PL/I, COBOL or Ada.

78. The computer program product of claim 75, wherein the characteristics of the execution environment of the data processing system comprise hardware features of the data processing system.

79. The computer program product of claim 75, wherein the characteristics of the execution environment of the data processing system comprise software executing on the data processing system.

* * * * *